(12) United States Patent
Takeda

(10) Patent No.: US 8,246,830 B2
(45) Date of Patent: Aug. 21, 2012

(54) METHOD AND DEVICE FOR REMOVING BIOLOGICAL NITROGEN AND SUPPORT THEREFOR

(75) Inventor: Shigeki Takeda, Minato-Ku (JP)

(73) Assignee: Metawater Co., Ltd., Minato-Ku (JP)

( * ) Notice: Subject to any disclaimer, the term of this patent is extended or adjusted under 35 U.S.C. 154(b) by 0 days.

(21) Appl. No.: 13/167,327

(22) Filed: Jun. 23, 2011

(65) Prior Publication Data

US 2011/0253625 A1    Oct. 20, 2011

Related U.S. Application Data

(63) Continuation of application No. PCT/JP2009/071181, filed on Dec. 18, 2009.

(30) Foreign Application Priority Data

Dec. 28, 2008 (JP) .................................. 2008-335593

(51) Int. Cl.
C02F 3/30 (2006.01)

(52) U.S. Cl. ......... 210/605; 210/615; 210/630; 210/259

(58) Field of Classification Search .................. 210/605, 210/615, 616, 630, 631, 252, 259, 903
See application file for complete search history.

(56) References Cited

U.S. PATENT DOCUMENTS

| 7,144,508 B2 * | 12/2006 | Isaka et al. ................... 210/605 |
| 2007/0218537 A1 | 9/2007 | Furukawa et al. |
| 2008/0245730 A1 | 10/2008 | Tokutomi |
| 2010/0230348 A1 * | 9/2010 | Isaka et al. ................... 210/605 |

FOREIGN PATENT DOCUMENTS

| JP | 2001-293494 A1 | 10/2001 |
| JP | 2003-154394 A1 | 5/2003 |
| JP | 2004-230259 A1 | 8/2004 |
| JP | 2006-055739 A1 | 3/2006 |
| JP | 2006-088092 A1 | 4/2006 |
| JP | 2008-114191 A1 | 5/2008 |
| JP | 2008-221160 A1 | 9/2008 |
| WO | 2005/095289 A1 | 10/2005 |
| WO | 2006/035885 A1 | 4/2006 |

OTHER PUBLICATIONS

Lei Zhang et al., "*Anaerobic Ammonium Oxidation for Treatment of Ammonium-Rich Wastewaters,*" Journal of Zhejiang University Science B, 2008, pp. 416-426.

* cited by examiner

*Primary Examiner* — Fred Prince
(74) *Attorney, Agent, or Firm* — Burr & Brown

(57) ABSTRACT

Provided is a biological nitrogen removal method which includes, causing to flow a support having, on the surface portion thereof, a two-layered microbial film which holes, in the outer layer, nitrite type nitrifying bacteria or aerobic bacteria and nitrite type nitrifying bacteria as a dominant species and, in the inner layer, anaerobic ammonia oxidizing bacteria as a dominant species while being surrounded with the nitrite type nitrifying bacteria; and thereby carrying out denitrification of the water to be treated by making use of the anaerobic ammonia oxidation reaction. In the biological nitrogen removal method, a feed rate of the support (total surface area of the support per unit capacity of the reaction tank) is adjusted so that an amount of nitrous acid produced by the nitrite type nitrification reaction through the action of the nitrite type nitrifying bacteria reaches a level to inhibit a nitrate type nitrification reaction.

6 Claims, 10 Drawing Sheets

▒ ANAEROBIC AMMONIA OXIDIZING ZONE
▓ NITRITE TYPE NITRIFYING ZONE

METHOD AND DEVICE FOR REMOVING BIOLOGICAL NITROGEN AND SUPPORT THEREFOR

FIELD OF THE INVENTION

The present invention relates to a biological nitrogen removal method and nitrogen removal device making use of an anaerobic ammonia oxidation reaction, with water to be treated containing a soluble nitrogen such as ammonia nitrogen as a target; a water treatment system equipped with the nitrogen removal device; and a support having thereon bacteria and utilized in the biological nitrogen removal method and the nitrogen removal device. More specifically, the invention relates to a biological nitrogen removal method and nitrogen removal device capable of carrying out denitrification at a practical level while relaxing limitations on an ammonia nitrogen concentration in water to be treated, which is the target of the treatment, and a water temperature, a DO value, and a pH value in a reaction tank; a water treatment system equipped with the nitrogen removal device; and a support having thereon bacteria and utilized in the biological nitrogen removal method and the nitrogen removal device.

BACKGROUND OF THE INVENTION

A denitrification technology with microorganisms has conventionally been performed with water containing ammonia nitrogen, for example, sewage, as a target. In this biological nitrogen removal technology, ammonia nitrogen in water to be treated is converted into a nitrogen gas through a two-stage biological reaction, that is, nitrification and denitrification and then, the resulting nitrogen gas is discharged out of the system. Described specifically, in the nitrification step, ammonia nitrogen is oxidized into nitrite nitrogen by making use of oxygen attributable to ammonia oxidizing bacteria under aerobic conditions and then the nitrite nitrogen is oxidized into nitrate nitrogen with nitrite oxidizing bacteria. Then, in the denitrification step, the nitrite nitrogen and the nitrate nitrogen are converted into a nitrogen gas by using denitrifying bacteria under oxygen free conditions while using an organic matter as an electron donor.

Such a biological nitrogen removal technology requires a large amount of oxygen in the nitrification step, while a large amount of an organic matter such as methanol should be added in the denitrification step, which totally increases a running cost. As a new biological nitrogen removal technology which has succeeded in overcoming such a technological problem, a biological nitrogen removal method and a biological nitrogen removal device making use of an anaerobic ammonia oxidation reaction are used. The term "anaerobic ammonia oxidation reaction" as used herein means a biological reaction making use of anaerobic ammonia oxidizing bacteria. The anaerobic ammonia oxidizing bacteria belong to a denitrification microorganism group capable of reacting ammonia nitrogen as an electron donor with nitrite nitrogen as an electron acceptor under anaerobic conditions to produce a nitrogen gas and they are denitrifying microorganisms which do not require addition of an organic matter upon denitrification.

Patent Document 1 discloses an example of a biological nitrogen removal method and a biological nitrogen removal device making use of such an anaerobic ammonia oxidation reaction. These biological nitrogen removal method and biological nitrogen removal device are roughly comprised of, from the upstream side to the downstream side of water to be treated, a partial nitritation tank, a pH regulating tank, and a denitrification tank. More specifically, in the partial nitritation tank, an ammonia nitrogen containing solution is aerated in the presence of ammonia oxidizing bacteria and a portion of an ammonia nitrogen component is oxidized even to nitrite nitrogen. In the denitrification tank, nitrite nitrogen and ammonia nitrogen in the water to be treated in the partial nitritation tank are reacted with each other to convert them into a nitrogen gas in the presence of anaerobic ammonia oxidizing bacteria. In the pH regulating tank, the water to be treated in the denitrification tank is circulated to the partial nitritation tank to effect pH regulation. A biological nitrogen removal method and a biological nitrogen removal device having such a constitution make it possible to carry out nitrification at a reduced aeration power and at the same time, omit addition of an organic matter such as methanol and thereby reduce a production amount of a sludge.

In such a biological nitrogen removal method and a biological nitrogen removal device, the partial nitritation tank, the pH regulating tank, and the denitrification tank should be provided separately and the pH in the nitritation tank and the denitrification tank should be adjusted to a pH value necessary for the partial nitritation reaction and the denitrification reaction, respectively, so that the device needs a high equipment cost as a biological nitrogen removal device and the method is not simple as a biological nitrogen removal method.

A biological nitrogen removal device and a biological nitrogen removal method making use of an anaerobic ammonia oxidation reaction, which have solved the above technological problem, are disclosed, for example, in Non-Patent Document 1. In this biological nitrogen removal device, nitrogen is removed by using a partial nitritation tank and a denitrification tank commonly as a single tank and causing a partial nitritation reaction and a denitrification reaction in this single tank without regulating a pH value. More specifically, a single tank into which water to be treated has been poured is charged with a support having, on the surface portion thereof, a two-layered microbial film having, in the outer layer, nitrite type nitrifying bacteria contributing to a nitrite type nitrification reaction as a dominant species and, in the inner layer, anaerobic ammonia oxidizing bacteria as a dominant species and the support is caused to flow in the water to be treated containing ammonia nitrogen to oxidize a portion of ammonia nitrogen into nitrite nitrogen through a nitrite type nitrification reaction with nitrite type nitrifying bacteria under aerobic conditions. Then, under anaerobic conditions in which presence of the nitrite type nitrifying bacteria enables blocking from oxygen in the water to be treated, the nitrite nitrogen and ammonia nitrogen are reacted and converted into a nitrogen gas through the action of the anaerobic ammonia oxidizing bacteria mainly present in the inner layer of the microbial film. Thus, denitrification is conducted. The biological nitrogen removal device and biological nitrogen removal method making use of such an anaerobic ammonia oxidation reaction make it possible to simplify the equipment and thereby reduce a cost and at the same time, omit the regulation of a pH value and thereby achieve simplification of the biological nitrogen removal method.

This biological nitrogen removal method making use of the anaerobic ammonia oxidation reaction however has the following technological problem. Described specifically, the water to be treated containing ammonia nitrogen cannot be subjected to biological nitrogen removal freely under any conditions because there are limitations on the ammonia nitrogen concentration of the water to be treated, which is a target of the treatment, and water temperature, DO value, and pH value in the reaction tank.

More specifically, according to the conventional biological nitrogen removal method making use of an anaerobic ammonia oxidation reaction, water to be treated containing ammonia nitrogen can be denitrified by using the following reaction process.

(1) nitrite type nitrification reaction:

$$NH_4^+ + 1.5O_2 \rightarrow NO_2^- + H_2O + 2H^+$$

(2) anaerobic ammonia oxidation reaction:

$$0.75NH_4^+ + NO_2^- \rightarrow 0.77N_2 + 0.19NO_3^- + 1.5H_2O + 0.10H^-$$

More specifically, nitrous acid is produced by placing, under aerobic conditions in the water to be treated containing ammonia nitrogen, a support having, on the surface portion thereof, a two-layered microbial film having, in the outer layer, nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria and thereby causing the nitrite type nitrification reaction, which is the reaction of (1), by the action of the nitrite type nitrifying bacteria present in the outer layer as a dominant species. Then, based on the ammonia nitrogen in the water to be treated and nitrate nitrogen thus produced, an anaerobic ammonia oxidation reaction which is the reaction of (2) is caused by the anaerobic ammonia oxidizing bacteria while satisfying anaerobic conditions because the anaerobic ammonia oxidizing bacteria are present in the inner layer of the microbial film while being surrounded with the nitrite type nitrifying bacteria, leading to the formation of nitrogen.

During the denitrification method by making use of such an anaerobic ammonia oxidation reaction, however, nitrous acid thus produced is inevitably oxidized into nitric acid through the nitrite type nitrifying bacteria as shown in the following reaction formula:

(3) Nitrate type nitrification reaction:

$$NO_2^- + 0.5O_2 \rightarrow NO_3^- + H_2O + 2H^+$$

In order to perform a biological nitrogen removal method at a practical level by making use of an anaerobic ammonia oxidation reaction, it is necessary to inhibit the nitrate type nitrification reaction, which is the reaction of (3), while increasing the amount of nitrous acid produced using the nitrite type nitrification reaction which is the reaction of (1), and thereby secure ammonia nitrogen and nitrite nitrogen necessary for the anaerobic ammonia oxidation reaction which is the reaction of (2).

In this respect, parameter factors such as ammonia nitrogen concentration in water to be treated and water temperature, DO value, and pH value in the tank are presumed to have an influence on the nitrite type nitrification reaction and the nitrate type nitrification reaction.

FIGS. 8 to 11 are graphs schematically showing the influence of a temperature of water to be treated, a DO (dissolved oxygen content) in the water to be treated, an ammonia nitrogen concentration in the water to be treated, and a pH in the water to be treated, respectively, on a proliferation rate or a reaction rate of nitrite type nitrifying bacteria and nitrate type nitrifying bacteria. As shown in FIG. 8, the higher the temperature of water to be treated, the higher the proliferation rate of the nitrite type nitrifying bacteria compared with that of the nitrate type nitrifying bacteria. The water to be treated therefore has preferably a high temperature. As shown in FIG. 9, the lower the DO (dissolved oxygen content) in the water to be treated, the lower the reaction rate of the nitrate type nitrifying bacteria compared with that of the nitrite type nitrifying bacteria. The water to be treated therefore has preferably a lower DO value while satisfying aerobic conditions. Further, as shown in FIG. 10, the higher the ammonia nitrogen concentration in the water to be treated, the lower the reaction rate of the nitrate type nitrifying bacteria compared with that of the nitrite type nitrifying bacteria. The water to be treated has preferably a higher ammonia nitrogen concentration. Furthermore, as shown in FIG. 11, the higher the pH of the water to be treated, the lower the proliferation rate of the nitrate type nitrifying bacteria compared with that of the nitrite type nitrifying bacteria. The water to be treated has therefore preferably a higher pH value.

As described above, in order to inhibit a nitrate type nitrification reaction, which is the reaction of (3), while increasing the amount of nitrous acid produced using a nitrite type nitrification reaction which is the reaction of (1), there are limitations on the ammonia nitrogen concentration in the water to be treated and the water temperature, DO value, and pH value in the tank. Thus, it is difficult to say that denitrification of water to be treated containing ammonia nitrogen can be performed at a practical level under any conditions by using an anaerobic ammonia oxidation reaction. This method is applied only to the treatment of wastewater, such as industrial wastewater and returned water from sludge treatment, having a high temperature and a high ammonia nitrogen concentration. Since municipal wastewater or domestic wastewater has a lower temperature and a lower ammonia nitrogen concentration, it is difficult to apply the method to the treatment of such wastewater as is.

PRIOR ART DOCUMENTS

Patent Document

Patent Document 1: JP-A-2006-88092

Non-Patent Document

Non-Patent Document 1: Journal of Zhejiang University SCIENCE B, 2008, pp 416-426, "Anaerobic ammonia oxidation for treatment of ammonium-rich wastewaters"

SUMMARY OF THE INVENTION

In view of the above-described technological problems, an object of the present invention is to provide a biological nitrogen removal method and a biological nitrogen removal device making use of an anaerobic ammonia oxidation reaction, which method and device can relax limitations on an ammonia nitrogen concentration in water to be treated, which is a target of the treatment, and a water temperature, a DO value, and a pH value in a reaction tank and at the same time, secure a denitrification efficiency of a practical level while simplifying a denitrification process; a water treatment system equipped with the biological nitrogen removal device; a support having thereon bacteria and used in the biological nitrogen removal method and the biological nitrogen removal device.

In the present invention, with a view to satisfying the above-described object, there is provided a biological nitrogen removal method making use of an anaerobic ammonia oxidation reaction, which includes, causing to flow a support, under aerobic conditions, in water to be treated containing a soluble nitrogen which has been poured in a reaction tank, the support having, on the surface portion thereof, a two-layered microbial film which holds, in the outer layer, nitrite type nitrifying bacteria contributing to a nitrite type nitrification reaction or aerobic bacteria decomposing the soluble nitrogen other than ammonia into ammonia and nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria; and thereby carrying out denitrification of the water to be treated by making use of the anaerobic ammonia oxidation reaction, wherein a feed rate of the support (total surface area of the support per unit capacity of the reaction tank) is adjusted so that an amount of nitrous acid produced by the nitrite type nitrification reaction through the action of the nitrite type nitrifying bacteria reaches a level to inhibit a nitrate type nitrification reaction.

In the present invention, there is also provided a biological nitrogen removal method making use of an anaerobic ammonia oxidation reaction, which includes, causing to flow a support, under aerobic conditions, in water to be treated containing a soluble nitrogen which has been poured in a reaction tank, the support having, on the surface portion thereof, a two-layered microbial film which holds, in the outer layer thereof, nitrite type nitrifying bacteria contributing to a nitrite type nitrification reaction or aerobic bacteria decomposing the soluble nitrogen other than ammonia into ammonia and nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria; and thereby carrying out denitrification of the water to be treated by making use of the anaerobic ammonia oxidation reaction, wherein a flow rate of the water to be treated at the surface of the support is adjusted so that an amount of nitrous acid produced by the nitrite type nitrification reaction through the action of nitrite type nitrifying bacteria reaches a level to inhibit a nitrate type nitrification reaction.

In the present invention, there is further provided a biological nitrogen removal method making use of an anaerobic ammonia oxidation reaction, which includes, causing to flow a support, under aerobic conditions, in water to be treated containing a soluble nitrogen which has been poured in a reaction tank, the support having, on the surface portion thereof, a two-layered microbial film which holds, in the outer layer, nitrite type nitrifying bacteria contributing to a nitrite type nitrification reaction or aerobic bacteria decomposing the soluble nitrogen other than ammonia into ammonia and nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria; and thereby carrying out denitrification of the water to be treated by making use of the anaerobic ammonia oxidation reaction, wherein a feed rate of the support (a total surface area of the support per unit capacity of the reaction tank) and a flow rate of the water to be treated at the surface of the support are adjusted so that an amount of nitrous acid produced by the nitrite type nitrification reaction through the action of the nitrite type nitrifying bacteria reaches a level to inhibit a nitrate type nitrification reaction.

These biological nitrogen removal methods according to the present invention have been made, while paying attention to the feed rate of the support in the water to be treated and/or the flow rate of the water to be treated on the surface of the support. Denitrification can be performed a practical level by making use of an anaerobic ammonia oxidation reaction while properly controlling the feed rate and/or flow rate to thereby relax limitations on the ammonia nitrogen concentration in the water to be treated, which is a target of the treatment, and the water temperature, DO value, and pH value in the reaction tank. More specifically, in the biological nitrogen removal method according to the present invention, ammonia nitrogen and nitrite nitrogen necessary for the anaerobic ammonia oxidation reaction which is the reaction of (2) is secured by controlling the feed rate of support in the water to be treated and/or the flow rate of the water to be treated at the surface of the support and thereby increasing the amount of nitrous acid produced by the nitrite type nitrification reaction which is the reaction of (1) while inhibiting the nitrate type nitrification reaction which is a reaction of (3).

More specifically, the biological nitrogen removal method according to the present invention is performed in accordance with the following process. First, control a feed rate of support based on a soluble nitrogen concentration in water to be treated. The term "feed rate of support" as used herein means a total surface area of a support per unit capacity of a reaction tank. For example, when the soluble nitrogen concentration in water to be treated is low, the feed rate of support is reduced. Then, cause the support to flow to form uniform distribution of it in the reaction tank. This makes it possible to secure a uniform ammonia load per unit hour and per surface area of the support entirely in the reaction tank. Under such a state, the nitrite type nitrification reaction is induced by the nitrite type nitrifying bacteria present in the outer portion as a dominant species on the surface portion of the support. A reduction in the feed rate of support as described above leads to an increase in the ammonia load per unit surface area of the support. As a result, due to proliferation of the nitrite type nitrifying bacteria contributing to the nitrite type nitrification reaction, the number of the nitrite type nitrifying bacteria per unit surface area of the support increases and a thickness of the outer portion of the microbial film having the nitrite type nitrifying bacteria as a dominant species increases, resulting in an increase in the removal rate of the ammonia nitrogen per surface area of the support.

Instead of control of the feed rate of support or in combination with control of the feed rate of support, a flow rate of the water to be treated at the surface of the support is controlled. For example, when the soluble nitrogen concentration in the water to be treated is low, the flow rate of the water to be treated at the surface of a support is increased. Such an increase in the flow rate of the water to be treated at the surface of the support increases a movable speed, per unit surface area of the support, of ammonium ions to the microbial film from the liquid phase. As a result, the nitrite type nitrifying bacteria contributing to the nitrite type nitrification reaction proliferate, the number of the nitrite type nitrifying bacteria increases per unit surface area of the support, and the thickness of the outer portion of the microbial film having the nitrite type nitrifying bacteria as a dominant species increases, making it possible to secure a nitrogen removal rate appropriate for the moving speed of ammonium ions.

When by controlling the feed rate of support and/or flow rate of water to be treated at the surface of the support, the thickness of the microbial film having the nitrite type nitrifying bacteria as a dominant species increases, the amount of nitrous acid produced by the nitrite type nitrification reaction increases, and the amount of nitrous acid produced by the reaction reaches a level sufficient to inhibit the nitrate type nitrification reaction, it is possible to secure nitrous acid necessary for the anaerobic ammonia oxidation reaction without converting the resulting nitrous acid to nitric acid. As a result, a removal rate of nitrogen per unit surface area of a support increases, making it possible to secure a nitrogen removal rate appropriate for the moving speed of ammonium ions from the liquid phase to the microbial film. Incidentally, it is necessary to use, as the support, that can have thereon a microbial film even if the microbial film has an increased thickness as described above.

The above-described points will next be described more specifically referring to FIGS. 12A to 12C. FIGS. 12A to 12C are schematic views showing how ammonia nitrogen concentration, nitrite nitrogen concentration, nitrate nitrogen concentration, and nitrogen gas concentration change with a DO value from the surface portion of a support toward the inner portion of the support. FIG. 12A shows an early biological nitrogen removal technology requiring a large amount of oxygen; FIG. 12B shows a conventional biological nitrogen removal technology making use of an anaerobic ammonia oxidation reaction; and FIG. 12C shows a biological nitrogen removal technology making use of an anaerobic ammonia oxidation reaction according to the present invention. In each drawing, the horizontal length of the rectangle means a thickness of a microbial film which the support has on the surface portion thereof and the surface portion of the microbial film is on the left side of this drawing. The perpendicular length of the rectangle shows the ammonia nitrogen concentration, the nitrite nitrogen concentration, the nitrate nitrogen concentration, and the nitrogen concentration. For example, in FIG. 12C, the DO value and the ammonia nitrogen concentration are maximum at the surface portion of the microbial film, but the DO value and the ammonia nitrogen concentration decrease toward the inner portion of the film (on the right side of the drawing) and at the same time, the nitrite nitrogen concentration increases. At the position where the DO value becomes zero, the nitrite nitrogen concentration exceeds the ammonia nitrogen concentration. At a more inner portion of the film, the nitrate nitrogen concentration and the nitrogen concentration increase, while the ammonia nitrogen concentration and the nitrite nitrogen concentration decrease.

Comparison among FIG. 12A to FIG. 12C has revealed that in FIG. 12A, the nitrate nitrogen concentration occupies the whole area after the nitrate nitrogen concentration starts increasing from the surface portion of the microbial film and the ammonia nitrogen concentration becomes zero, while in FIGS. 12B and 12C, the nitrite nitrogen concentration and the ammonia nitrogen concentration are secured at a position where the DO value becomes zero and as a result, an anaerobic ammonia oxidation reaction occurs under anaerobic conditions. After that, both the nitrogen concentration and the nitrate nitrogen concentration increase. It has been elucidated from the comparison in the nitrite nitrogen concentration and the ammonia nitrogen concentration at a position where the DO value becomes 0 between FIG. 12B and FIG. 12C that due to a difference in the thickness of the microbial film caused by the control of the feed rate of support and/or the flow rate of water to be treated at the surface of the support, the nitrite nitrogen concentration is higher in FIG. 12C in which the microbial film is thicker. A subsequent nitrate nitrification reaction is therefore suppressed.

According to the preferred embodiment of the present invention, the feed rate of support is preferably controlled so that an influent soluble-nitrogen load be from 4.0 to 11.5 g/(m$^2$ of support)/day. More specifically, the feed rate of support is preferably controlled to from 4 to 40 m$^2$/m$^3$. In addition, the present invention is performed preferably while stirring the water to be treated so that the maximum flow rate of the water to be treated in the reaction tank be 0.7 m/sec or greater. In addition, the present invention is performed while setting the ORP (oxidation reduction potential) of the water to be treated to preferably −150 mV or less, more preferably −300 mV or less. Further, the present invention is performed more preferably without pouring an active sludge in the reaction tank. Moreover, the water to be treated containing a soluble nitrogen, which is the target of the treatment of the present invention, may be wastewater having a normal temperature and a soluble nitrogen concentration of 50 mg/L or less.

In order to achieve the above object, there is provided in the present invention a biological nitrogen removal device making use of an anaerobic ammonia oxidation reaction, which includes a reaction tank for pouring therein water to be treated containing a soluble nitrogen, a support placed in the reaction tank and having, on the surface portion thereof, a two-layered microbial film having, in the outer layer, nitrite type nitrifying bacteria contributing to a nitrite type nitrification reaction or aerobic bacteria decomposing a soluble nitrogen other than ammonia into ammonia and nitrite type nitrifying bacteria contributing to a nitrite type nitrification reaction as a dominant species and, in the inner layer, anaerobic ammonia oxidizing bacteria present as a dominant species while being surrounded with the nitrite type nitrifying bacteria, a flow means placed in the reaction tank for causing the support to flow in the water to be treated, and an air diffusion means placed in the reaction tank for supplying oxygen to the water to be treated; wherein the flow means is a stirrer having a stirring power sufficient to adjust the moving speed, per unit surface area of the film, of ammonium ions to the microbial film through the adjustment of the flow rate of the water to be treated at the surface portion of the support.

In the biological nitrogen removal apparatus having the constitution as described above, a stirrer having a stirring power sufficient to control the moving speed of ammonium ions to the microbial film, per unit surface area of the film, through the control of the flow rate of the water to be treated at the surface portion of the support is used. This makes it possible to increase the amount of nitrous acid produced by the nitrite type nitrification reaction through the action of nitrite type nitrifying bacteria present as a dominant species in the outer layer of the two-layered microbial film supported on the surface portion of the support to a level sufficient to inhibit a nitrate type nitrification reaction and to secure ammonia nitrogen and nitrite nitrogen necessary for the anaerobic ammonia oxidation reaction.

The pH control has conventionally been carried out individually in a nitritation tank in which a nitrite type nitrification reaction is conducted and an anaerobic ammonia oxidation tank in which an anaerobic ammonia oxidation reaction is conducted. In the present invention, on the other hand, the nitrite type nitrification reaction and the anaerobic ammonia oxidation reaction are carried out in the same tank, which enables omission of such pH control. In the preferred embodiment of the present invention, the stirrer is a draft tube aerator.

In order to achieve the above object, there is provided in the present invention a water treatment system (first water treatment system) of water to be treated containing a soluble nitrogen, which includes the biological nitrogen removal device of the present invention, a first settling tank placed on the upstream side of the reaction tank of the biological nitrogen removal device for precipitating a solid organic matter from the water to be treated, a coagulant adding means for adding a coagulant to coagulate the solid organic matter and/or phosphorus contained in the water to be treated from which nitrogen has been biologically removed in the reaction tank, and a second settling tank placed on the downstream side of the reaction tank for precipitating the solid organic matter and/or phosphorus coagulated by using the coagulant adding means.

In the present invention, there is also provided a water treatment system (second water treatment system) of water to be treated containing a soluble nitrogen, which includes the biological nitrogen removal device of the present invention, a coagulant adding means for adding a coagulant to coagulate a solid organic matter and/or phosphorus in the water to be treated, a first settling tank placed on the upstream side of the reaction tank of the biological nitrogen removal apparatus of the present invention for precipitating the solid organic matter and/or phosphorus coagulated by the coagulant adding means, and a second settling tank placed on the downstream side of the reaction tank for precipitating a solid matter.

The water treatment systems having the above constitution can reduce an oxygen amount necessary for denitrifying the water to be treated by carrying out denitrification through the anaerobic ammonia oxidation reaction. In addition, use of a support having thereon bacteria for denitrification instead of an active sludge can omit equipment for returning the active sludge to the reaction tank and at the same time, oxygen is not consumed for decomposition of solid organic matters inevitably mixed in the active sludge. In total, these systems can markedly reduce an oxygen amount necessary for the water treatment of water to be treated containing ammonia nitrogen.

The first water treatment system and the second water treatment system are similar to each other in that they have the biological nitrogen removal apparatus of the present invention. They are however different that in the first water treatment system, a coagulant is added by the coagulant adding means to water to be treated from which nitrogen has been removed biologically in the reaction tank and the solid organic matter and/or phosphorus thus coagulated is precipitated in the second settling tank placed on the downstream side of the reaction tank, while in the second water treatment system, a coagulant is added by the coagulant adding means to water to be treated not subjected to the biological nitrogen removal treatment in the reaction tank and the solid organic matter and/or phosphorus thus coagulated is precipitated in the first settling tank on the upstream side of the reaction tank.

In order to achieve the above-described object, there is provided in the present invention a support, having, in the surface portion thereof, a two-layered microbial film having, in the outer layer, nitrite type nitrifying bacteria contributing to a nitrite type nitrification reaction or aerobic bacteria decomposing a soluble nitrogen other than ammonia into ammonia and nitrite type nitrifying bacteria contributing to a nitrite type nitrification reaction as a dominant species and, in the inner layer, anaerobic ammonia oxidizing bacteria present as a dominant species while being surrounded with the nitrite type nitrifying bacteria and capable of denitrifying water to be treated containing a soluble nitrogen by causing the support to flow in the water to be treated under aerobic conditions and making use of an anaerobic ammonia oxidation reaction, wherein even if the nitrite type nitrifying bacteria proliferate so as to increase an amount of nitrous acid produced by the nitrite type nitrification reaction through the action of the nitrite type nitrifying bacteria to such a level as to inhibit a nitrate type nitrification reaction and the microbial film has an increased thickness, the support has water absorbing properties and/or hydrophilic properties sufficient to have thereon the microbial film and at the same time, has strength properties sufficient to withstand shear force acting on the support when the support flows in the water to be treated.

Even if the nitrite type nitrifying bacteria proliferate so as to increase the production amount of nitrous acid by the nitrite type nitrification reaction through the action of the nitrite type nitrifying bacteria to such a level as to inhibit a nitrate type nitrification reaction and the microbial film has an increased thickness, the support having the above composition has water absorbing properties and/or hydrophilic properties sufficient to have thereon the microbial film having such a thickness and at the same time, has strength properties sufficient to withstand shear force acting on the support when the support flows in the water to be treated when the movable speed of ammonium ions, per unit surface area of the support, from the liquid phase to the microbial film is raised by increasing the flow rate of the water to be treated at the surface portion of the support. It is therefore possible to carry out denitrification at a denitrification efficiency of a practical level by making use of an anaerobic ammonia oxidation reaction while relaxing limitations on the ammonia nitrogen concentration of the water to be treated, which is a target of the treatment, and water temperature, DO value, and pH value in the reaction tank.

According to the preferred embodiment of the present invention, the support is preferably made of a water absorbing polyurethane resin having a hydrophilic TPU resin as a main component. In addition, a crosslinking agent which is a hydrophobic prepolymer is preferably added to the support.

As described above, acceleration of a nitrite type nitrification reaction and suppression of a nitrate type nitrification reaction have been achieved respectively by controlling the ammonia nitrogen concentration of water to be treated, which is a target of the treatment, and the water temperature, DO value, and pH value in the reaction tank. In the present invention, on the other hand, in order to simultaneously achieve acceleration of a nitrite type nitrification reaction and suppression of a nitrate type nitrification reaction by making use of the fact that formation of nitrous acid contributes to the inhibition of a nitrate type nitrification reaction, acceleration of the nitrite type nitrification reaction is performed at such a level as to suppress the nitrate type nitrification reaction. This makes it possible to carry out denitrification in a practical level by making use of an anaerobic ammonia oxidation reaction while relaxing the limitations on the ammonia nitrogen concentration in the water to be treated, which is a target of the treatment, and the water temperature, DO value, and pH value in the reaction tank.

DETAILED DESCRIPTION OF THE INVENTION

Figure 1:
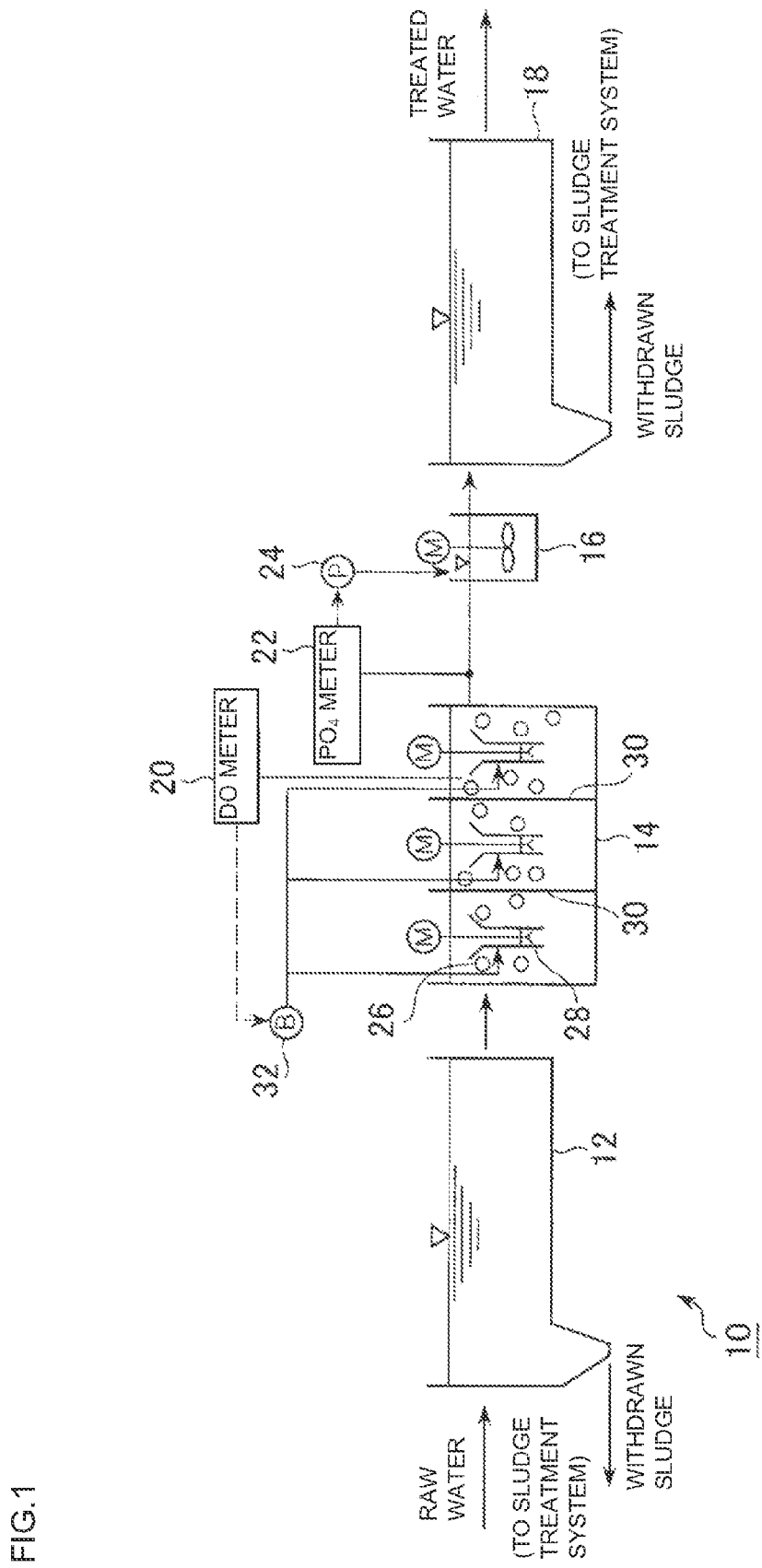
FIG. 1 is a schematic view of a water treatment system according to an embodiment of the present invention.

An embodiment of the water treatment system having a biological nitrogen removal device making use of an anaerobic ammonia oxidation reaction according to the present invention will next be described in detail referring to drawings. As illustrated in FIG. 1, this treatment system 10 of water to be treated is roughly comprised of, from the upstream side to the downstream side of the water to be treated, a first settling tank 12, a reaction tank 14, a mixing tank 16, a second settling tank 18, a DO meter 20, a $PO_4$ meter 22, and a coagulant injection pump 24.

The water to be treated which can be a target of the treatment in the present invention is a liquid containing a soluble nitrogen as nitrogen. It may contain, as well as ammonia nitrogen, nitrite nitrogen, organic nitrogen, and another nitrogen and it may be sewage, excrement, food effluent, plant effluent, or another industrial effluent. The present invention is characterized by that denitrification in a practical level can be achieved by making use of an anaerobic ammonia oxidation reaction while relaxing limitations on the ammonia nitrogen concentration of water to be treated, which is a target of the treatment, and water temperature, DO value, and pH value in the reaction tank. It can also be applied to, for example, municipal wastewater or domestic wastewater having both a normal temperature and a soluble nitrogen concentration as low as 50 mg/L or less.

The first settling tank 12 is provided for precipitating and removing solid matters from water to be treated which is poured in the tank. A supernatant in this tank is allowed to flow in the reaction tank 14 on the downstream side of the tank through a connecting tube. A sludge accumulated on the bottom of the first settling tank 12 is removed periodically from the first settling tank 12 and sent to a sludge treatment system, where it is disposed as is.

The reaction tank 14 is a single tank. It is divided into three portions with a partition 30 and these three portions thus obtained are communicated to each other. Conventionally, a nitritation tank for conducting therein a nitrite type nitrification reaction therein and an anaerobic ammonia oxidation reaction tank for conducting therein an anaerobic ammonia oxidation reaction are provided separately. In the nitritation tank, a nitritation step of oxidizing ammonia nitrogen in water to be treated into nitrite nitrogen through the action of ammonia oxidizing bacteria under aerobic conditions is conducted, while in the anaerobic ammonia oxidation reaction tank, an anaerobic ammonia oxidation reaction step of generating a nitrogen gas through the action of autotrophic microorganisms is conducted, while using nitrite nitrogen as an electron receptor and remaining ammonia nitrogen as an electron donor. In the present invention, on the other hand, these aerobic nitritation step and anaerobic ammonia oxidation reaction step are performed in a single tank.

More specifically, a support 26 having bacteria thereon is charged in the reaction tank 14. From an air diffuser disposed in the reaction tank, oxygen is supplied to the water to be treated which has been fed through a pipe from the first settling tank 12. At the same time, the water to be treated is stirred to cause the support 26 having bacteria thereon to flow in the water to be treated, whereby the support is distributed uniformly in the water to be treated.

Figure 3:
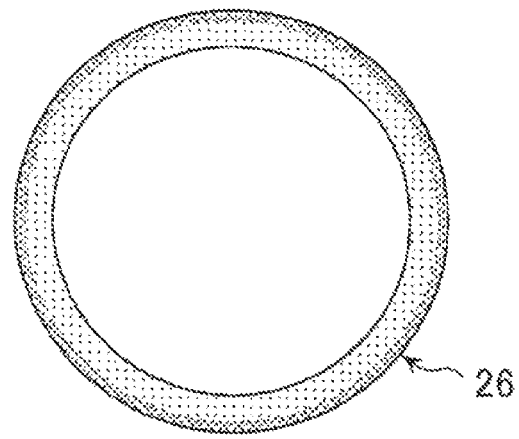
FIG. 3 is a schematic cross-sectional view of a support to be used in a reaction tank according to the embodiment of the present invention.

As illustrated in FIG. 3, the support 26 is a granular support made of a resin and the support 26 may have any size and any form insofar as the support 26 can retain bacteria thereon even if it flows in the water to be treated. For example, it may have a columnar, spherical or the like shape and have an external dimension of about several millimeters. As illustrated in FIG. 3, the support 26 has, on a nitrite type nitrification zone on the surface portion thereof, mainly nitrite type nitrifying bacteria and has, in an anaerobic ammonia oxidation reaction zone, mainly anaerobic ammonia oxidation reaction bacteria. Incidentally, the nitrite type nitrification zone may have, in addition to the nitrite type nitrifying bacteria, aerobic bacteria which decompose soluble nitrogens other than ammonia into ammonia. More specifically, the support 26 has, on the surface portion thereof, a two-layered microbial film having, in the outer layer thereof, nitrite type nitrifying bacteria contributing to a nitrite type nitrification reaction or aerobic bacteria decomposing a soluble nitrogen other than ammonia into ammonia and nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria. In the support 26 in the water to be treated, aerobic conditions are kept for the nitrite type nitrifying bacteria positioned as a dominant species at an outer side, while anaerobic conditions are kept for the anaerobic ammonia oxidation reaction bacteria positioned on the inner side while being surrounded with the nitrite type nitrifying bacteria. When both the nitrite type nitrifying bacteria and aerobic bacteria that decompose a soluble nitrogen other than ammonia into ammonia are supported on the outer layer of the two-layered microbial film, the soluble nitrogen other than ammonia is decomposed into ammonia through the action of the aerobic bacteria and then, provided for the nitrite type nitrification reaction using the nitrite type nitrifying bacteria.

Examples of the nitrite type nitrifying bacteria contributing to the nitrite type nitrification reaction include *Nitorosomonas* sp. bacteria. Examples of the aerobic bacteria that decompose soluble nitrogens other than ammonia into ammonia include *Bacillus* sp. bacteria.

As described below, the material of the support 26 is required to have strength properties capable of withstanding shear force resulting from a strong stirring power from the air diffuser and acting on the surface portion of the support 26 and at the same time have water absorbing properties or hydrophilic properties sufficient to retain the nitrite type nitrifying bacteria and the anaerobic ammonia oxidation reaction bacteria on the surface portion while the support 26 flows in the water to be treated. In particular, in the present invention, the feed rate of support is adjusted, depending on the soluble nitrogen concentration, whereby the thickness of the microbial film present on the surface portion of the support 26 and having nitrite type nitrifying bacteria as a dominant species is increased. The support is required to have properties capable of retaining the nitrite type nitrifying bacteria and the anaerobic ammonia oxidation reaction bacteria even if the microbial film has an increased thickness as described above.

In this point, the support 26 is preferably made of, for example, expandable and water absorbing polyurethane, particularly that having TPU (thermoplastic polyurethane resin), which is a hydrophilic resin, as a main component at a relatively high concentration and containing a crosslinking agent which is a hydrophobic prepolymer to keep strength properties.

In order to carry, on the surface portion of a support, a two-layered microbial film having, in the outer layer, nitrite type nitrifying bacteria contributing to a nitrite type nitrification reaction or aerobic bacteria decomposing soluble nitrogens other than ammonia into ammonia and nitrite type nitrifying bacteria contributing to a nitrite type nitrification reaction as a dominant species and, in the inner layer, anaerobic ammonia oxidizing bacteria contributing to an anaerobic ammonia oxidation reaction as a dominant species while being surrounded with the nitrite type nitrifying bacteria, a small amount of a sludge containing these bacteria is attached to the surface of the support and the resulting support is charged in a tank containing soluble-nitrogen-containing water such as sewage and is left as is for several days to proliferate the bacteria. Since the nitrite type nitrifying bacteria and aerobic bacteria proliferate under aerobic conditions and the anaerobic ammonia oxidizing bacteria proliferate under anaerobic conditions, the nitrite type nitrifying bacteria and the aerobic bacteria become dominant species in the outer layer of the microbial film and the anaerobic ammonia oxidizing bacteria become dominant species in the inner layer without any particular operation.

Figure 2:
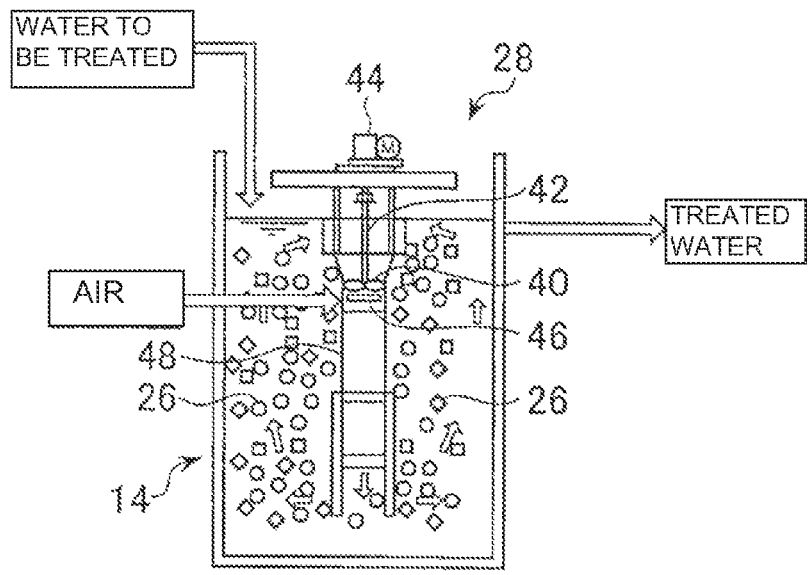
FIG. 2 is a schematic view of a reaction tank and vicinity thereof according to the embodiment of the present invention.

The air diffuser used in the invention is not a conventionally used diffuser but is preferably one equipped with a function of both causing oxygen to exist as dissolved oxygen in the water to be treated and a function of stirring and causing the water to be treated to flow together with the support 26 in the water to be treated. From this standpoint, a draft tube aerator 28 is preferred. FIG. 2 shows one of the three portions of the reaction tank 14 divided with the partition 30 in FIG. 1. As illustrated in FIGS. 1 and 2, the draft tube aerator 28 is a known device and it has, as a fundamental constitution, a shaft 42 having, at the lower end thereof, an impeller 40, a drive unit 44 connected to the shaft 42, an air diffuser tube 46 positioned rightly below the impeller 40, a blower 32 communicated with the air diffuser tube 46, and a draft tube 48 having the substantially same diameter as that of the impeller 40 and extending downward from the impeller 40. The shaft 42 is rotated using the drive unit 44 to stir the water to be treated through the impeller 40 and at the same time, air is fed to the water to be treated from the blower 32 through the air diffuser tube 46. Then, the water to be treated and air bubbles are brought to the bottom portion of the reaction tank through the draft tube 48 to enhance the stirring power at the bottom and increase a dissolved oxygen efficiency. The blower 32 is connected to the DO meter 20. The air amount (aeration amount) fed from the blower 32 is adjusted, depending on the DO value in the water to be treated as measured using the DO meter 20, whereby the DO value in the water to be treated is properly adjusted.

Figure 13:
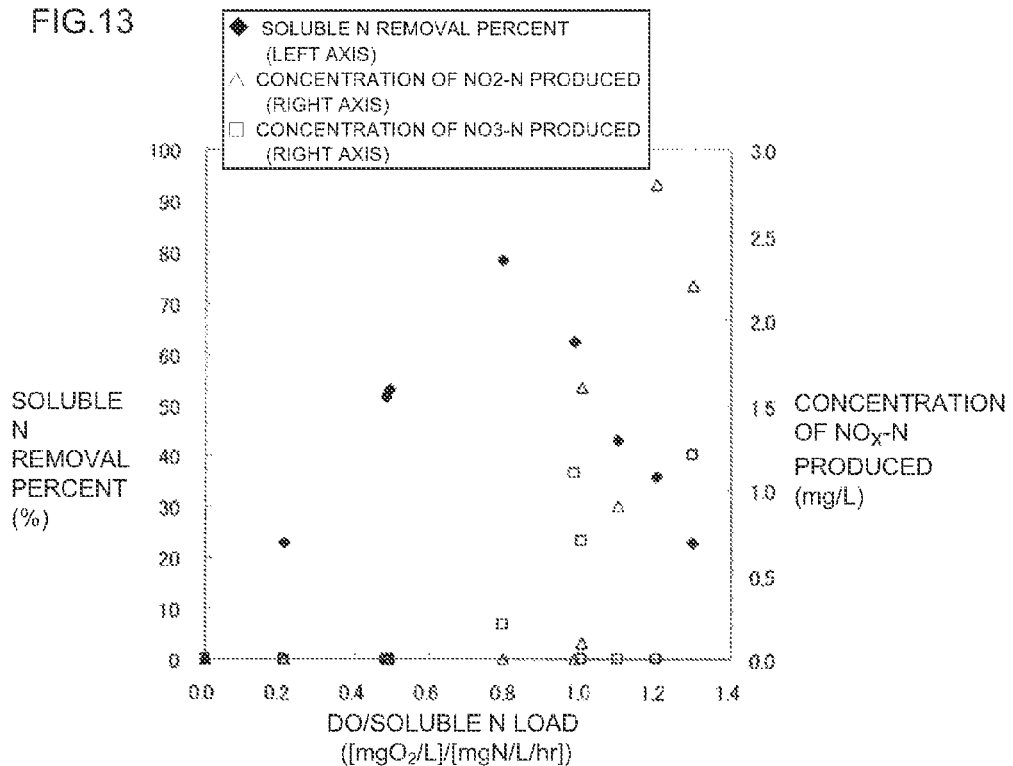
FIG. 13 is a graph showing how a soluble nitrogen removal rate, a concentration of $NO_2$—N produced, and a concentration of $NO_3$—N produced changes with a ratio of DO to a soluble, nitrogen load.

FIG. 13 is a graph showing how each of a soluble nitrogen removal rate, a concentration of $NO_2$—N produced, and a concentration of $NO_3$—N produced in the water to be treated which has been denitrified using the biological nitrogen removal method of the present invention changes with a ratio of DO to a soluble nitrogen load. As is apparent from this graph, when the ratio of DO to a soluble nitrogen load is too low, a sufficient oxygen concentration cannot be kept in the outer layer of the two-layered microbial film having nitrite type nitrification bacteria as a dominant species so that the amount of nitrous acid produced by the nitrite type nitrification reaction becomes insufficient, leading to only a low nitrogen removal rate. On the other hand, when a ratio of DO to a soluble nitrogen load is too high, nitrous acid produced by the nitrite type nitrification reaction is oxidized by a nitrate type nitrification reaction due to excess oxygen, leading to production of nitric acid. At the same time, oxygen reaches even to the inner layer of the two-layered microbial film having anaerobic ammonia oxidizing bacteria as a dominant species and anaerobic conditions cannot be satisfied fully, which prevents the acceleration of the anaerobic ammonia oxidation reaction, leading to a low nitrogen removal rate.

Figure 14:
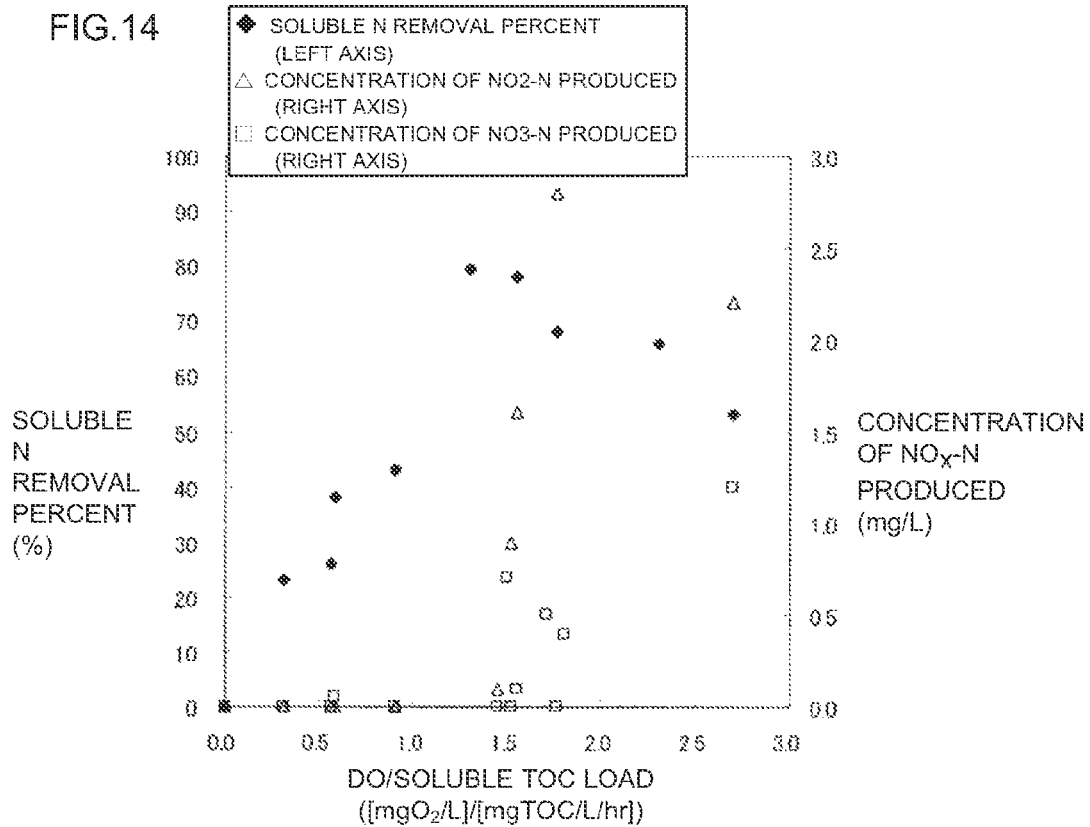
FIG. 14 is a graph showing how a soluble nitrogen removal rate, a concentration of $NO_2$—N produced, and a concentration of $NO_3$—N produced changes with a ratio of DO to a soluble total organic carbon load.

Thus, DO should be supplied in an amount neither greater nor less than the amount necessary for a nitrogen removal reaction. However, since DO is consumed not only for the nitrogen removal reaction but also by an organic matter in the treated water, it is difficult to set an appropriate aeration amount based only on the soluble nitrogen load. FIG. 14 is a graph showing how a soluble nitrogen removal rate, a concentration of $NO_2$—N produced, and a concentration of $NO_3$—N produced in the water to be treated which has been denitrified using the biological nitrogen removal method of the present invention changes with a ratio of DO to a soluble total organic carbon load. As is apparent from this graph, low ratios of DO to a soluble total organic carbon load make it difficult to keep an amount of DO necessary for the nitrogen removal reaction, leading to a low nitrogen removal rate.

Figure 15:
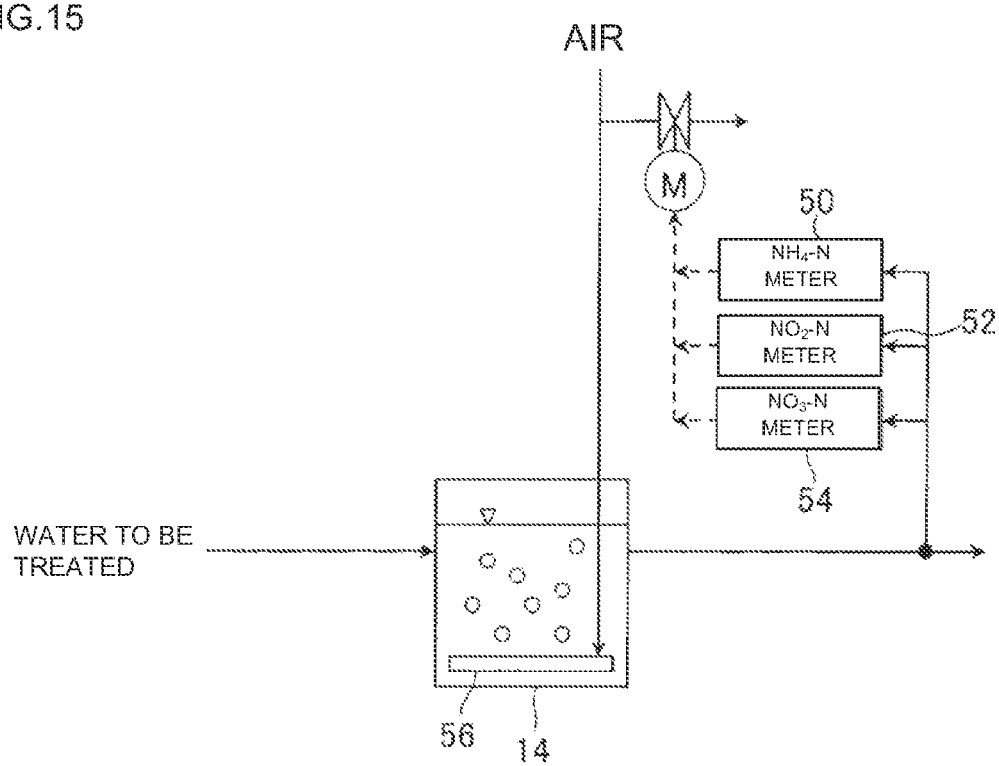
FIG. 15 is a schematic view showing an example of a control method of an aeration amount in a reaction tank.

With the foregoing in view, it is therefore more preferred to adjust the aeration amount in the reaction tank 14 in accordance with a method shown in FIG. 15. Described specifically, the reaction tank 14 is provided with, on the downstream side thereof, an $NH_4$—N meter 50 for measuring an ammonia nitrogen ($NH_4$—N) concentration, an $NO_2$—N meter 52 for measuring an nitrite nitrogen ($NO_2$—N) concentration, and an $NO_3$—N meter 54 for measuring a nitrate nitrogen ($NO_3$—N) concentration and by using them, the $NH_4$—N concentration, $NO_2$—N concentration, and $NO_3$—N concentration in the water to be treated discharged from the reaction tank 14 are measured to control the aeration amount (air supply amount to an air diffuser 56) as described below in (a) to (c).

(a) Reduce an aeration amount when the $NO_3$—N concentration reaches or exceeds a preset value.

(b) Reduce an aeration amount when the $NO_2$—N concentration reaches or exceeds a preset value.

(c) Increase an aeration amount when an $NH_4$—N concentration reaches or exceeds a preset value.

Excessive aeration is suppressed by conducting the above operations (a) and (b) and insufficient aeration is stopped by the operation (c). The priority of the adjustment is given to (a), (b), and (c) in order of mention.

As illustrated in FIG. 1, the mixing tank 16 is connected to the downstream side of the reaction tank 14 via a pipe attached with the $PO_4$ meter 22 between them and the mixing tank 16 has therein a motor-driven stirrer. According to such a constitution, the $PO_4$ concentration of the water to be treated, which has been treated with the nitrite type nitrifying bacteria and anaerobic ammonia oxidizing bacteria in the reaction tank 14, is measured using the $PO_4$ meter. Depending on the $PO_4$ concentration thus measured, a coagulant for coagulating a solid organic matter and/or phosphorus, for example, poly(aluminum chloride) (PAC) is fed to the water to be treated in the mixing tank 16 by driving the coagulant injection pump 24 and at the same time, the water to be treated is stirred using the stirrer. Thus, removal of the solid organic matter and/or phosphorus in the water to be treated is continued until they (or it) have a predetermined concentration.

The mixing tank 16 has, on the downstream side thereof, the second settling tank 18 via a pipe and the solid organic matter and/or phosphorus coagulated by using the coagulant in the mixing tank 16 is precipitated in this second settling tank 18. The phosphorus thus precipitated is periodically withdrawn from the bottom of the second settling tank 18 and is transferred to a sludge treatment system, wherein it is disposed. On the other hand, a supernatant in the second settling tank 18 is transferred out of the system as treated water which has finished denitrification and phosphorus removal. Incidentally, the $PO_4$ meter 22, the coagulant injection pump 24, and the mixing tank 16 may be placed on the upstream side of the first settling tank 12. In this case, a coagulant is added to water to be treated from which nitrogen has not yet been removed biologically in the reaction tank 14; a solid organic matter and/or phosphorus coagulated by the coagulant is precipitated in the first settling tank 12 placed on the upstream side of the reaction tank 14; and a solid matter contained in the water which has finished denitrification and phosphorus removal is precipitated in the second settling tank 18 placed on the downstream side of the reaction tank 14.

Effects of the water treatment system 10 having the above constitution will next be described in detail. First, water to be treated is supplied to the first settling tank 12. Foreign matters in the water to be treated are precipitated in the first settling tank 12, while a supernatant in the first settling tank 12 is transferred to the reaction tank 14 via a pipe. A sludge precipitated on the bottom of the first settling tank 12 is withdrawn as needed and transferred to a sludge treatment system, in which it is disposed.

Then, in the reaction tank 14, nitrogen is removed from the water to be treated by the biological nitrogen removal method of the present invention. More specifically, the water to be treated poured into the reaction tank 14 is stirred with the draft tube aerator 28. As a result, a plurality of supports 26 having, on the surface portion thereof, nitrite type nitrifying bacteria and anaerobic ammonia oxidation reaction bacteria is caused to flow uniformly in the water to be treated as shown with the arrow of FIG. 2 and at the same time, air is supplied into the water to be treated by using the draft tube aerator 28. At this time, by measuring the concentration of dissolved oxygen in the water to be treated by the DO meter 20 and controlling the blower 32 of the draft tube aerator 28 based on it, predetermined aerobic conditions are created in the water to be treated. In addition, based on the soluble nitrogen concentration of the water to be treated, which has been charged into the reaction tank 14, the feed rate of the support 26 to the water to be treated is adjusted in advance.

More specifically, the feed rate of support is defined as a surface area of the support 26 per unit capacity of the reaction tank 14 and such a feed rate of support can be adjusted by increasing or decreasing the number of the support 26 to be fed to the reaction tank 14. Under such a state, in the water to be treated which has been poured in the reaction tank 14, first, a nitrite type nitrification reaction occurs under aerobic conditions and ammonia nitrogen is converted into nitrite nitrogen through the action of nitrite type nitrifying bacteria present as a dominant species in the outer layer of the microbial film which each support 26 has on the surface portion thereof. Upon this reaction, by adjusting the feed rate of support in advance, for example, decreasing the feed rate of support, the thickness of the microbial film having nitrite type nitrifying bacteria as a dominant species can be increased through the nitrite type nitrification reaction. In this case, since each of the supports 26 has strength properties sufficient to withstand shear force acting on the surface portion of the support 26 due to strong stirring power of the air diffuser and at the same time, it has water absorbing properties or hydrophilic properties enabling retention, on the surface portion of the support, of nitrite type nitrifying bacteria and anaerobic ammonia oxidation reaction bacteria during the flow of each of the supports 26 in the water to be treated, it is possible to prevent release of the bacteria from the support 26 or damage of the support itself which will otherwise occur due to proliferation of bacteria or increase in the thickness of the microbial film.

Based on the finding that as the flow rate of the water to be treated at the surface portion of the support 26 is higher, the moving speed of ammonium ions to the microbial film per surface area of the film can be made higher, it is also possible to control a production amount of nitrous acid due to a nitrite type nitrification reaction to such a level as to inhibit a nitrate type nitrification reaction by enhancing the stirring power of the draft tube aerator 28 for stirring the water to be treated to increase the flow rate of the water at the surface portion of the support 26 having on the surface portion thereof bacteria and thereby increasing the moving speed of ammonium ions to the microbial film per unit surface area of the film. It is also possible to increase the nitrogen removal efficiency further by using in combination adjustment of the feed rate of support and adjustment of the flow rate of the water to be treated at the surface of the support through the adjustment of the stirring power of the draft tube aerator 28 for stirring the water to be treated.

Such an adjustment increases the removal rate of soluble nitrogen per unit surface area of the support 26 and accelerates the nitrite type nitrification reaction further. As a result, nitrous acid is formed. In this case, nitrous acid is formed at such a level as to prevent a nitrate type nitrification reaction and even if nitrous acid is formed, it becomes possible to keep nitrite nitrogen necessary for the anaerobic ammonia oxidation reaction without converting the nitrous acid thus formed into nitric acid. As described above, the production amount of nitrous acid by the nitrite type nitrification reaction is increased to such a level as to prevent a nitrate type nitrification reaction by adjusting a feed rate of support in the water to be treated and/or flow rate of the water to be treated at the support surface, ammonia nitrogen and nitrite nitrogen necessary for the anaerobic ammonia oxidation reaction are secured.

Then, anaerobic ammonia oxidizing bacteria present as a dominant species in the inner layer of the two-layered microbial film which each of the supports 26 has on the surface portion thereof cause an anaerobic ammonia oxidation reaction under pseudo anaerobic conditions, whereby ammonia nitrogen and nitrite nitrogen are converted into nitrogen.

The water to be treated is then transferred to the mixing tank 16 through a pipe. At this time, the amount of a coagulant supplied into the mixing tank 16 is adjusted by controlling the coagulant injection pump 24 based on the $PO_4$ concentration measured using the $PO_4$ meter and at the same time, the water to be treated is stirred, resulting in coagulation of $PO_4$ through the action of the coagulant. Then, the water to be treated is transferred to the second settling tank 18 via a pipe. Solid organic matters and/or phosphorus thus coagulated are precipitated and a precipitated sludge is transferred to a sludge treatment system, in which it is disposed. The supernatant in the second settling tank 18 after biological nitrogen removal and phosphorus removal is reused as treated water or disposed. The water treatment using the water treatment system 10 of the present invention is thus completed. The present water treatment may be either continuous treatment while continuously pouring water to be treated or may be, in some cases, batch treatment.

The water treatment system 10 having the above constitution can reduce an oxygen amount necessary for denitrification of water to be treated by carrying out denitrification while using an anaerobic ammonia oxidation reaction. In addition, since it uses for denitrification a support having thereon bacteria instead of an active sludge, it does not need equipment for returning the active sludge to a reaction tank and at the same, it does not consume oxygen upon decomposition of a solid organic matter inevitably mixed in the active sludge. As a result, in total, a marked reduction in an oxygen amount necessary for the treatment of water to be treated containing soluble nitrogen such as ammonia nitrogen can be achieved.

Figure 17:
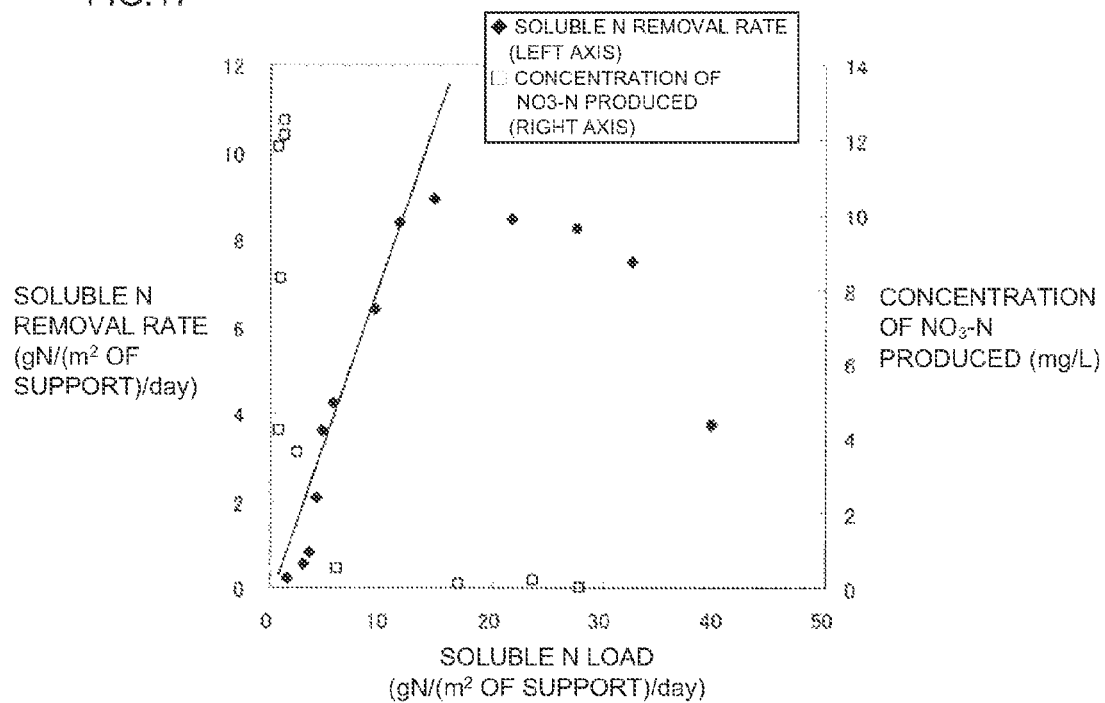
FIG. 17 is a graph shows how a soluble nitrogen removal rate and a concentration of $NO_3$—N produced change with an influent soluble nitrogen load.

When the biological nitrogen removal method of the present invention is conducted, it is preferred to adjust the feed rate of support so that the influent soluble nitrogen load be from 4.0 to 11.5 g/(m² of support)/day. FIG. 17 is a graph showing how a soluble nitrogen removal rate and a concentration of $NO_3$—N produced change with an influent soluble nitrogen load. As this graph shows, the soluble nitrogen removal rate shows an almost linear increase and a soluble nitrogen removal rate (inclination of a straight line in the graph) becomes maximum when the influent soluble nitrogen load is from 4.0 to 11.5 g/(m² of support)/day. When the influent soluble nitrogen load is less than 4.0 g/(m² of support)/day, the concentration of $NO_3$—N produced is high so that it is presumed that the nitrate type nitrification reaction cannot be inhibited easily. When the influent soluble nitrogen load exceeds 11.5 g/(m² of support)/day, a reduction in the soluble nitrogen removal rate starts.

Specifically, the feed rate of support is adjusted to preferably from 4 to 40 m²/m³. Rough adjustment of it within this range enables to increase the amount of nitrous acid produced by the nitrite type nitrification reaction to such a level as to suppress a nitrate type nitrification reaction, leading to achievement of a high soluble nitrogen removal rate. In addition, it is preferred to carry out the present invention while stirring the water to be treated so that the maximum flow rate of the water to be treated in the reaction tank be 0.7 m/sec or greater. Such stirring increases the flow rate of water to be treated at the surface of the support. As a result, the amount of nitrous acid produced by the nitrite type nitrification reaction can be increased to such a level as to suppress a nitrate type nitrification reaction, leading to achievement of a high soluble nitrogen removal rate.

Figure 18:
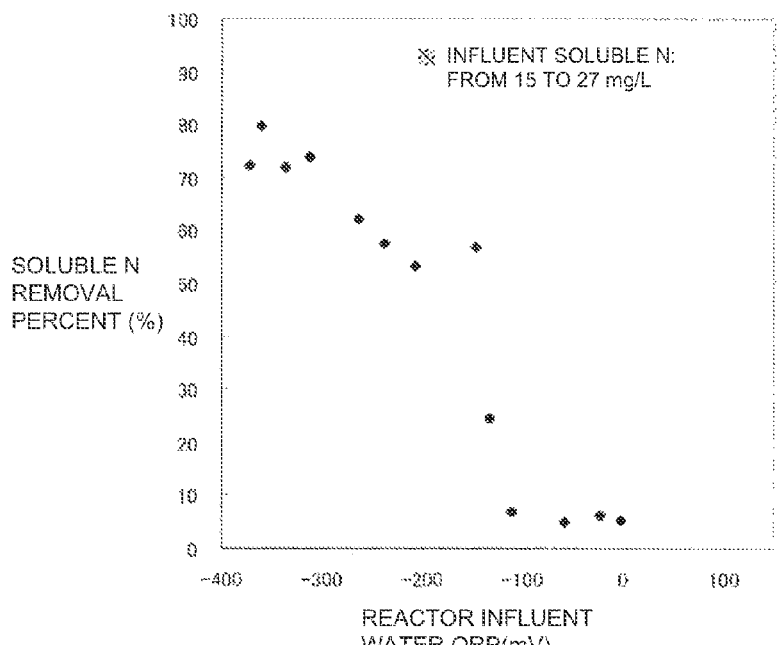
FIG. 18 is a graph showing how a soluble nitrogen removal rate changes with an oxidation reduction potential of influent water of a reaction tank.

In addition, the biological nitrogen removal method of the present invention is conducted while adjusting the ORP (oxidation reduction potential) value of water to be treated to preferably −150 mV or less, more preferably −300 mV or less. FIG. 18 is a graph showing how a soluble nitrogen removal rate changes with an oxidation reduction potential of influent water in a reaction tank. As shown in this graph, when the oxidation reduction potential of influent water in a reaction tank is −150 mV or less, particularly −300 mV or less, the soluble nitrogen removal rate is high. When it exceeds −150 mV, on the other hand, a drastic reduction in soluble nitrogen removal rate occurs.

Figure 16:
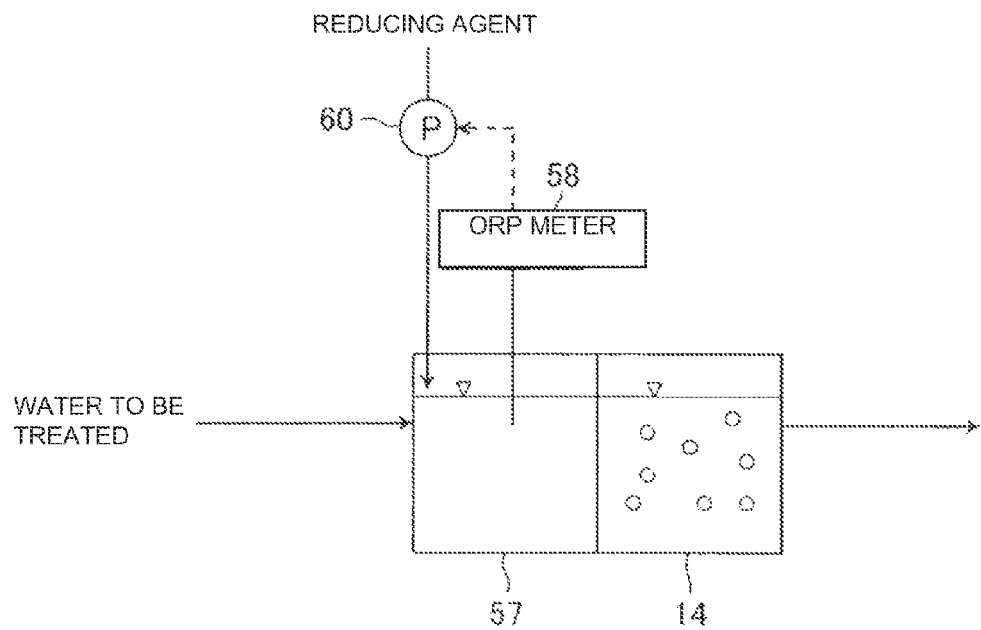
FIG. 16 is a schematic view showing an example of a control method of ORP in water to be treated.

When the ORP value of water to be treated is high, the ORP value can be reduced, for example, by pouring a reducing agent in the water to be treated. For example, as illustrated in FIG. 16, an ORP regulating tank 57 is provided on the preceding stage (upstream side) of the reaction tank 14. The ORP value of the water to be treated which has been poured in the ORP regulating tank 57 is measured using an ORP meter 58. A reducing agent injection pump 60 is controlled and the amount of the reducing agent to be injected into the ORP regulating tank 57 is adjusted to give a predetermined ORP value. The water to be treated which has been adjusted to have a predetermined ORP value through the injection of the reducing agent is poured into a reaction tank 14 at the subsequent stage (downstream side). As the reducing agent, either a sludge generated in the water treatment step such as a withdrawn sludge from the first settling tank or an industrially produced chemical may be used. The chemical is preferably resistant to oxidation with an organic matter contained in the water to be treated and, for example, sodium sulfide is preferred.

Figure 19:
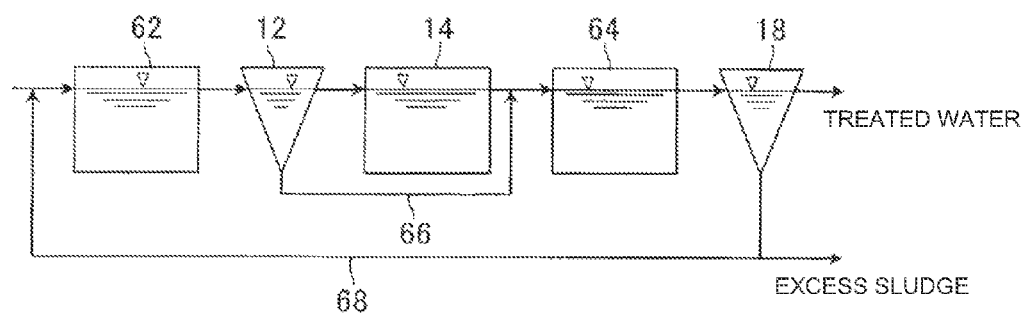
FIG. 19 is a flow chart when nitrogen is removed using the biological nitrogen removal method of the present invention and soluble organic matters and phosphorus are removed using an active sludge.

Although it is possible to remove nitrogen by using the biological nitrogen removal method of the present invention and remove soluble organic matters and phosphorus by using an active sludge, in this case, nitrogen removal by using the biological nitrogen removal method of the present invention is preferably performed without pouring the active sludge into a reaction tank. The active sludge poured into the reaction tank may presumably interfere with the reaction making use of bacteria in the biological nitrogen removal method of the present invention. FIG. 19 is a flow chart showing the case where nitrogen is removed using the biological nitrogen removal method of the present invention and soluble organic matters and phosphorus are removed by using an active sludge. Thus, removal of soluble organic matters and phosphorus by using an active sludge without pouring the active sludge in the reaction tank 14 can be achieved by installing an anaerobic tank 62 upstream the first settling tank 12 and the reaction tank 14 and an aerobic tank 64 between the reaction tank 14 and the second settling tank 18 and providing a by-path 66 from the first settling tank 12 to the aerobic tank 64 without passing through the reaction tank 14 and a return path 68 from the second settling tank 18 to the anaerobic tank 62.

Specifically, soluble organic matters in the water to be treated are removed using an active sludge in the anaerobic tank 62. Then, the water to be treated in the anaerobic tank 62, together with the active sludge, flows in the first settling tank 12 and in the first settling tank 12, the active sludge and the solid organic matters are precipitated and separated from the mixture. A supernatant free of the active sludge and the solid organic matters flows in the reaction tank 14 and after removal of nitrogen in the reaction tank 14 by using the biological nitrogen removal method of the present invention, the residue flows in the aerobic tank 64. On the other hand, the active sludge precipitated and separated from the water in the first settling tank 12 flows in the aerobic tank 64 through the by-path 66 without flowing in the reaction tank 14. The active sludge thus flowing in the aerobic tank 64 takes and accumulates therein phosphorus contained in the nitrogen-removed water which has also flowed in the aerobic tank 64. Then, the water to be treated, from which phosphorus has been removed by the active sludge, transfers to the second settling tank 18, together with the active sludge which has accumulated phosphorus therein. The active sludge and the other solid matters are precipitated and separated from the mixture in the second settling tank 18. A supernatant free of the active sludge and solid matters (the water to be treated from which nitrogen, phosphorus, and soluble organic matters have been removed) is sent out the system. On the other hand, a portion of the active sludge precipitated and separated from the water is discharged from the system as an excess sludge, while a remaining portion is returned to the anaerobic tank 62 through the return path 68 while accumulating therein phosphorus. The active sludge thus returned to the anaerobic tank 62 releases its accumulated phosphorus in the anaerobic tank 62 and at the same time, removes soluble organic matters from water to be treated again. Incidentally, during the transfer of the active sludge from the aerobic tank 64 to the second settling tank 18, a coagulant may be added to the active sludge to coagulate phosphorus.

By operating the system so as to circulate the active sludge while bypassing the reaction tank 14, nitrogen removal of water to be treated can be performed by the biological nitrogen removal method of the present invention without causing the active sludge to flow in the reaction tank 14 and the soluble organic matters and phosphorus can be removed using the active sludge. When the anaerobic tank 62 is located on the upstream side of the reaction tank 14, the anaerobic tank 62 serves to reduce the ORP value of water to be treated so that the ORP value of the water to be treated can be reduced to a preferable range without adding a reducing agent as described above and a running cost can therefore be reduced compared with the case where a reducing agent is added.

The embodiment of the present invention has been described above in detail, but various modifications or changes can be made by those skilled in the art without departing from the scope of the present invention. For example, the feed rate of support is adjusted by adjusting the number of supports to be charged in the reaction tank in the present embodiment. The feed rate of support is adjusted not only by it but by changing the surface geometry of the support, thereby changing the surface are of the support. In the present embodiment, the inside of the single-tank reaction tank is divided with partitions, but the reaction tank is not limited to it but may be a reaction tank having, inside thereof, only one space without being divided with partitions. In the present embodiment, tanks of the water treatment system are connected to each other via a pipe, but not only such a connection system but also, for example, an overflow system using no pipe may be employed. In the present embodiment, a draft tube aerator is employed as a stirrer, but without limitation to it, another stirrer may be employed insofar as it can provide sufficient stirring power for the treatment of water to be treated. In the present embodiment, the support is made of a polyurethane resin, but without limitation to it, the support may be made of another resin insofar as, even if nitrite type nitrifying bacteria proliferate so as to increase the production amount of nitrous acid by the nitrite type nitrification reaction through the action of the nitrite type nitrifying bacteria to such a level as to inhibit a nitrate type nitrification reaction and the microbial film has an increased thickness, the support has water absorbing properties and/or hydrophilic properties sufficient to have thereon the microbial film and at the same time, has strength properties sufficient to withstand shear force acting on the support when the support flows in the water to be treated.

EXAMPLES

The present invention will next be described by examples in further detail. It should however be borne in mind that the present invention is not limited to or by them.

Example 1

The present inventors made a test on normal sewage at a practical level by using the reaction tank 14 described in the above embodiment. As a result, it has been confirmed that when stirring a support having, on the surface portion thereof, nitrite type nitrifying bacteria and anaerobic ammonia oxidizing bacteria in the sewage, which is water to be treated, while diffusing air into the sewage by using a draft tube aerator, it is possible to secure a denitrification efficiency of a practical level while relaxing limitations on the ammonia nitrogen concentration in water to be treated and water temperature, DO value, and pH value in the reaction tank by adjusting a feed rate of support. The term "denitrification efficiency" as used herein means a nitrogen removal amount per unit reaction capacity per unit hour.

Table 1 shows comparison between operation conditions employed here (operation conditions in examples of the present invention) and operation conditions disclosed in Non-Patent Document 1. Table 2 shows the specification of the support 26 employed this time. In either operation conditions, the support 26 has, on the surface portion thereof, a two-layered microbial film. The two-layered microbial film has, in the outer layer thereof, nitrite type nitrifying bacteria contributing to a nitrite type nitrification reaction in the reaction tank 14 as a dominant spaces and in the inner layer, anaerobic ammonia oxidizing bacteria contributing to an anaerobic ammonia oxidation reaction in the reaction tank as a dominant species while being surrounded with the nitrite type nitrifying bacteria. The nitrite type nitrifying bacteria present as a dominant species in the outer layer of the microbial film cause a nitrite type nitrification reaction under aerobic conditions, by which a portion of ammonia nitrogen is converted into nitrite nitrogen and then, ammonia nitrogen and nitrite nitrogen are converted into nitrogen under anaerobic conditions by the anaerobic ammonia oxidizing bacteria present as a dominant species in the inner layer of the microbial film. However, the support is caused to flow by using a stirring means under the present operation conditions, while the support is fixed under the operation conditions disclosed in Non-Patent Document 1. As shown in Table 1, under the present operation conditions, the water to be treated has a water temperature of from 15 to 29° C., an influent ammonia nitrogen concentration of from 10 to 15 mg/L, and a DO value of from 2.5 to 3.0 mgO$_2$/L, while under the operation conditions disclosed in Non-Patent Document 1, the water to be treated has a water temperature of 20° C. or greater, an influent ammonia nitrogen concentration of 200 mg/L or greater, and a DO value of 0.5 mgO$_2$/L or less. Comparison between them has revealed that in the present operation conditions, water to be treated having a normal water temperature and a low ammonia nitrogen concentration is used and a limitation on the DO value is relaxed.

As shown in Table 1 and Table 2, under the present operation conditions, a granular resin support made of a water absorbing polyurethane resin containing 84.5% of a hydrophilic resin and 6.5% of a crosslinking agent is employed as the support 26. Accordingly, the support 26 can have thereon bacteria irrespective of an increase in the thickness of the microbial film due to proliferation of nitrite type nitrifying bacteria and anaerobic ammonia oxidizing bacteria borne on the surface portion of the support 26 and is equipped with strength properties capable of withstanding shear force acting on the surface portion of the support 26 caused by stirring power of the draft tube aerator 28 used for aeration and stirring. Under the operation conditions disclosed in Non-Patent Document 1, on the other hand, the stirring power required for stirring of the water to be treated is set small.

Under the present operation conditions, as shown in Table 2, the feed rate of support is 15 m$^2$/m$^3$ in terms of (total surface area of support)/(reaction tank capacity), by which an influent ammonia nitrogen load is kept at from 6.0 to 9.0 g/(m$^2$ of support)/day. As shown in Table 1, on the other hand, under the operation conditions disclosed in Non-Patent Document 1, when a support is used, an influent ammonia nitrogen load is from 1 to 8 g/(m$^2$ of support)/day. When biological nitrogen removal of water to be treated is conducted under such operation conditions, a denitrification efficiency of a practical level can be secured, though the limitations on the ammonia nitrogen concentration of water to be treated and water temperature, DO value, and pH value in the reaction tank are relaxed under the present operation conditions compared with the operation conditions disclosed in Non-Patent Document 1.

Figure 8:
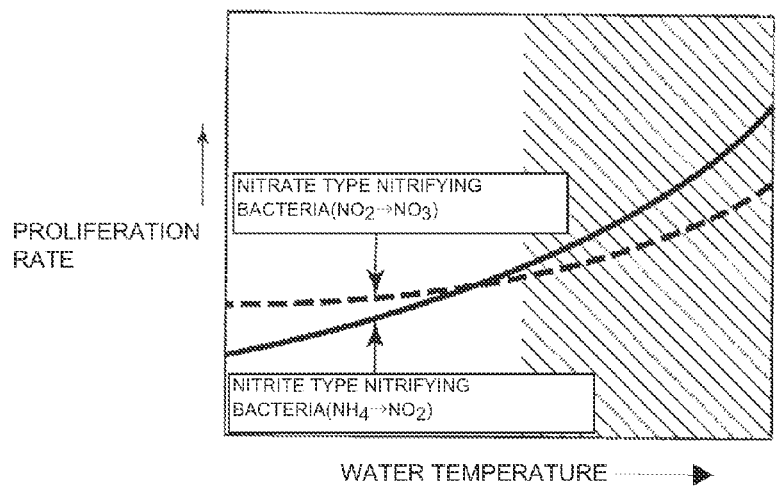
FIG. 8 is a graph showing how a proliferation rate of each of nitrite type nitrifying bacteria and nitrate type nitrifying bacteria changes with water temperature.
Figure 9:
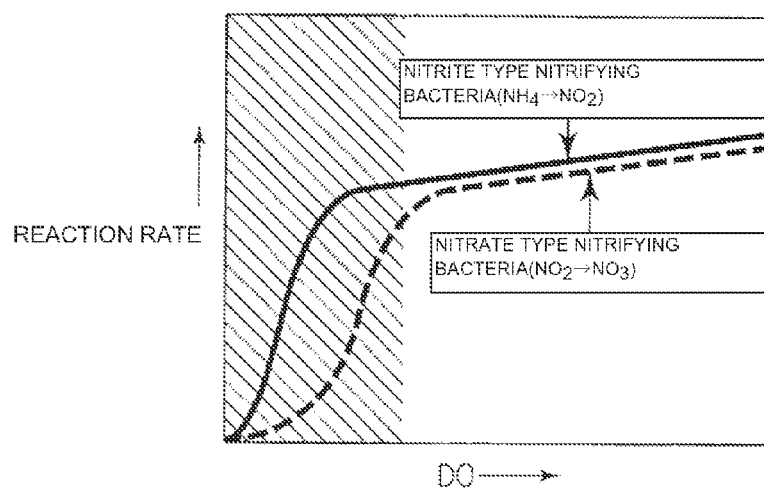
FIG. 9 is a graph showing how a reaction rate of each of nitrite type nitrifying bacteria and nitrate type nitrifying bacteria changes with a DO value.
Figure 10:
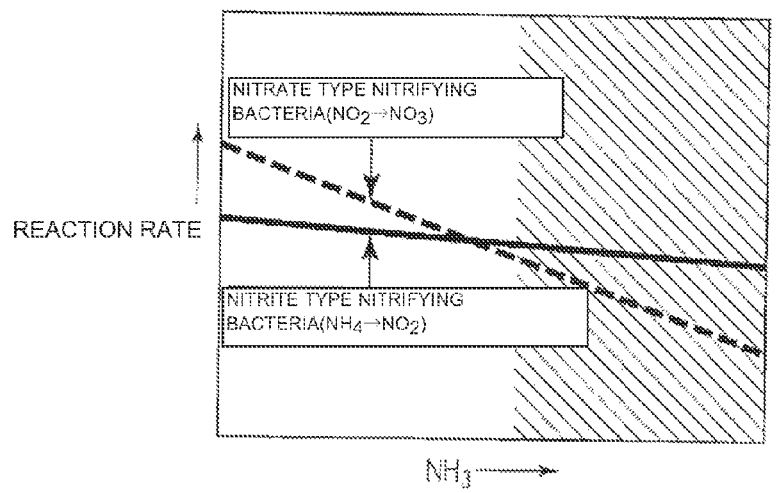
FIG. 10 is a graph showing how a reaction rate of each of nitrite type nitrifying bacteria and nitrate type nitrifying bacteria changes with an ammonia nitrogen concentration.
Figure 11:
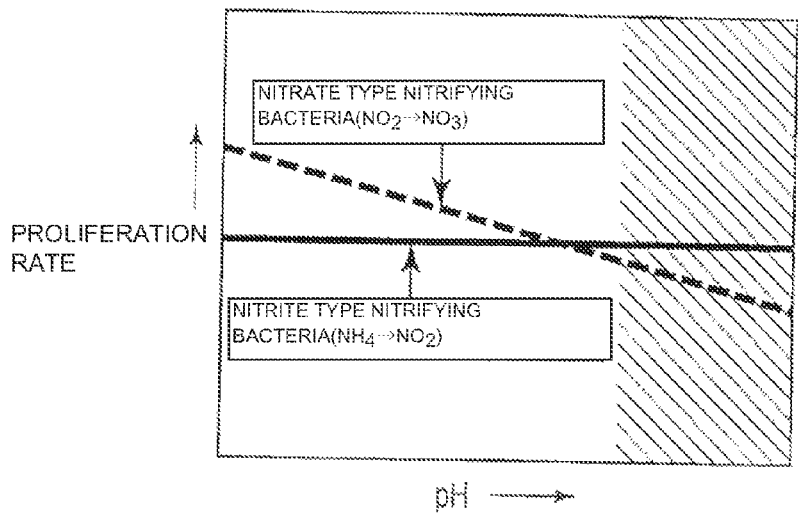
FIG. 11 is a graph showing how a proliferation rate of each of nitrite type nitrifying bacteria and nitrate type nitrifying bacteria changes with a pH value.
Figure 12A:
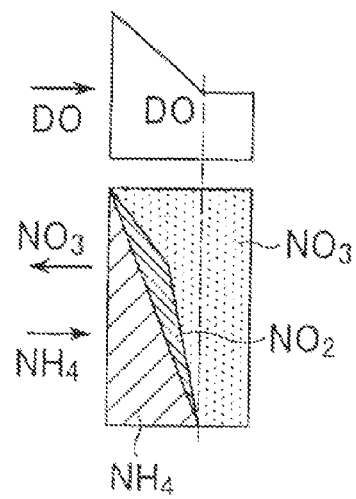
FIG. 12A is a schematic view showing the distribution of each of an ammonia nitrogen concentration, a nitrite nitrogen concentration, and a nitrate nitrogen concentration in the thickness direction of a support with a change in DO value and shows a conventional technology in which nitrification is performed with ammonia oxidizing bacteria and nitrite oxidizing bacteria.
Figure 12B:
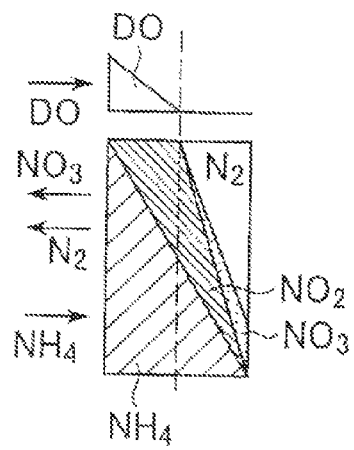
FIG. 12B is a schematic view showing the distribution of each of an ammonia nitrogen concentration, a nitrite nitrogen concentration, and a nitrate nitrogen concentration in the thickness direction of a support with a change in DO value and shows a conventional technology in which denitrification is performed with ammonia oxidizing bacteria and anaerobic ammonia oxidizing bacteria.
Figure 12C:
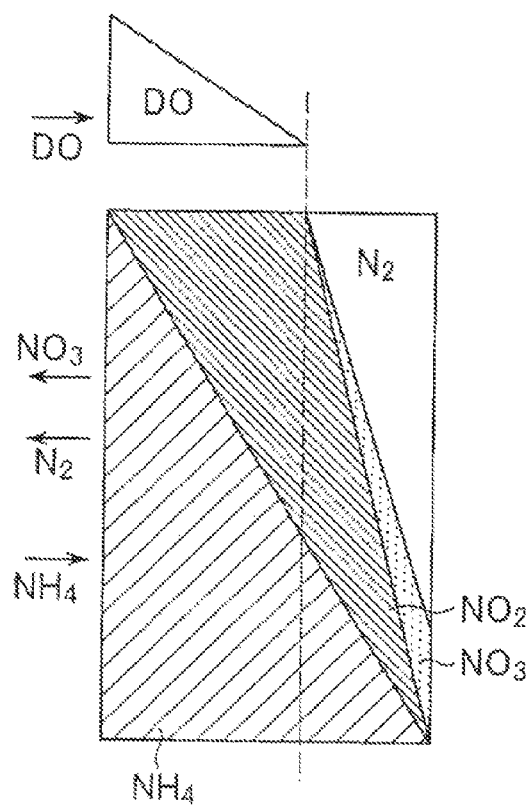
FIG. 12C is a schematic view showing the distribution of each of an ammonia nitrogen concentration, a nitrite nitrogen concentration, and a nitrate nitrogen concentration in the thickness direction of a support with a change in DO value and shows an invention case in which denitrification is performed with ammonia oxidizing bacteria and anaerobic ammonia oxidizing bacteria.

Under the present operation conditions, by setting the feed rate of support at a low level and thereby increasing the thickness of the microbial film of each of the supports 26 and at the same time, enhancing the flow rate of water to be treated at the surface portion of the support 26 when the support 26 is caused to flow in the water to be treated with the draft tube aerator 28, a removal rate of ammonia nitrogen per unit surface area of the support increases and a nitrite type nitrification reaction is accelerated so as to suppress a nitrate type nitrification reaction. Under the operation conditions in Non-Patent Document 1, on the other hand, such thickening of the microbial film does not occur because the feed rate of support is high so that acceleration of a nitrite type nitrification reaction and inhibition of a nitrate type nitrification reaction should be carried out separately. Described specifically, it is presumed that under the operation conditions in Non-Patent Document 1, the nitrite type nitrification reaction is accelerated by setting the temperature of water to be treated in the reaction tank high and thereby making the proliferation rate of the nitrite type nitrifying bacteria greater than that of the nitrate type nitrifying bacteria (refer to FIG. 8); the nitrite type nitrification reaction is accelerated by setting the influent ammonia nitrogen concentration high and thereby making the reaction rate of the nitrite type nitrifying bacteria greater than that of the nitrate type nitrifying bacteria (refer to FIG. 10); and moreover, the nitrate type nitrification reaction is accelerated by setting the DO value low and thereby making the reaction rate of the nitrite type nitrifying bacteria greater than that of the nitrate type nitrifying bacteria (refer to FIG. 9).

Figure 4:
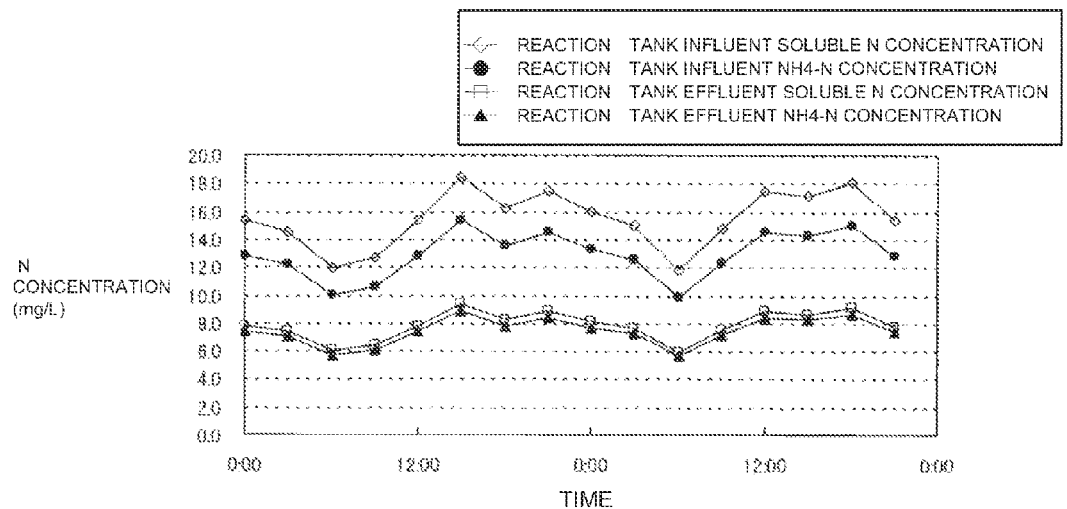
FIG. 4 is a graph showing a time change of each of a soluble nitrogen concentration of influent water of a reaction tank, an $NH_4$—N concentration of influent water of the reaction tank, a soluble nitrogen concentration of effluent of the reaction tank, and an $NH_4$—N concentration of effluent water of the reaction tank.

FIG. 4 is a graph showing a time change of each of a soluble nitrogen concentration of reaction tank influent water, an NH$_4$—N concentration of reaction tank influent water, a soluble nitrogen concentration of reaction tank effluent water, and an NH$_4$—N concentration of reaction tank effluent water, when continuous operation is performed under the present operation conditions. Each of the concentrations was measured for 45 hours from 0:00 on the day when measurement was started to 21:00 on the next day. As is apparent from the graph, even when the soluble nitrogen concentration and NH$_4$—N concentration in the reaction tank influent water vary greatly, the variation in the soluble nitrogen concentration and NH$_4$—N concentration in the reaction tank effluent water is small. This means that a stably high denitrification efficiency is achieved.

TABLE 1

|  | The present invention (actual operation conditions) | Conventional method according to Non-Patent Document 1 |
|---|---|---|
| Bacteria supporting method | Granular resin support (refer to Table 2) | Immobilized support: PVC rotary disk · plastic · non-woven cloth When no support is used: granule · membrane reactor · active sludge |
| DO | From 2.5 to 3.0 mgO$_2$/L | 0.5 mgO$_2$/L or less |
| Adjustment of pH | None | None |
| Aeration means | Draft tube aerator | Diffuser |
| Stirring means | Draft tube aerator | Immobilized support: not stirred When no support is used: diffuser |
| Water temperature | From 15 to 29° C. | 20° C. or greater |
| Influent NH$_4$—N concentration | From 10 to 15 mg/L | 200 mg/L or greater |
| Influent NH$_4$—N load | From 0.08 to 0.12 kgN/m$^3$/day From 6.0 to 9.0 g/((m$^2$ of support))/day | When a support is used: from 1 to 8 g/((m$^2$ of support))/day When no support is used: 0.12 kgN/m$^3$/day or greater |

TABLE 2

| Shape | Cylindrical gear shape |
|---|---|
| Dimension | Diameter: 4 mm, length: 4.3 mm |
| Specific gravity | 1.00 or greater but not greater than 1.01 |
| Material | Chemical name: water absorbing polyurethane resin (ether-based) |
| Composition | Main component: polyurethane resin: 99% or greater hydrophilic resin: 84.5%, hydrophobic resin: 8%, crosslinking agent (hydrophobic prepolymer): 6.5%, specific gravity regulator: 0.5%, |

TABLE 2-continued

| | |
|---|---|
| Strength | activated charcoal: 0.5%<br>Hardness *[1]: about 50 |
| Feed rate of support | 15 m$^2$/m$^3$ in terms of total surface area of support reaction tank capacity |
| Influent NH$_4$—N load (per support) | from 6.0 to 9.0 g/((m$^2$ of support))/day |

*[1] measured in accordance with JIS K7311

Example 2

In order to confirm the influence of the feed rate of support on the nitrogen removal rate, the present inventor made a test (batch test) as described below by taking out a small amount of a support used for the continuous operation in Example 1 and charging it in a beaker containing sewage of an actual sewage plant as water to be treated. The test was made under the following conditions.

(Common Conditions)

(1) Bacteria: nitrite type nitrifying bacteria and anaerobic ammonia oxidizing bacteria (2) Bacteria supporting method: a two-layered microbial film having, in the outer layer thereof, nitrite type nitrifying bacteria as a dominant species and in the inner layer, anaerobic ammonia oxidation dye as a dominant species while being surrounded with the nitrite type nitrifying bacteria is supported on a columnar support (4.0 mm diameter×4.3 mm length) made of a polyurethane resin.

(3) Water to be treated: a supernatant obtained by precipitating a mixture in an aeration tank of a sewage plant.

(4) Amount of water: 300 mL (beaker)

(5) DO supply: by aeration and stirring (Test Conditions)

Figure 5:
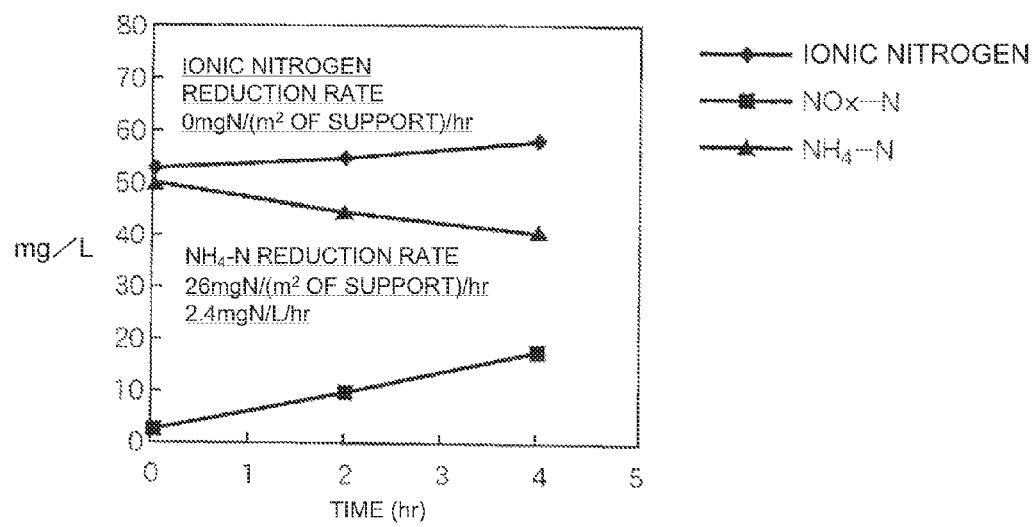
FIG. 5 is a graph showing a time change, in Example 2, of each of an ionic nitrogen concentration, an $NO_x$—N concentration, and an $NH_4$—N concentration when a feed rate of support is 90 m²/m³ in terms of a (total surface area of support)/(capacity of reaction tank).

(A) A test was performed by taking out the supports during use in Example 1 at a feed rate of support of 15 m$^2$/m$^3$ in terms of (total surface area of support)/(reaction tank capacity); pouring the supports to 300 mL of water to be treated so that the feed rate of support be 90 m$^2$/m$^3$ in terms of (total surface area of support)/(reaction tank capacity); and stirring the resulting mixture thoroughly (FIG. 5).

Figure 6:
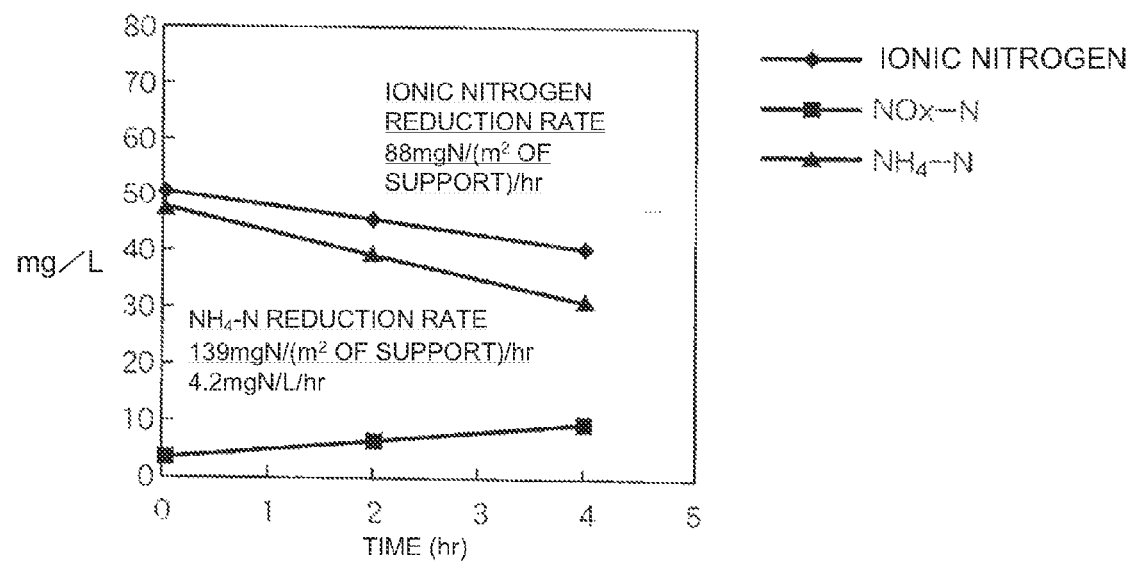
FIG. 6 is a graph showing a time change, in Example 2, of each of an ionic nitrogen concentration, an $NO_x$—N concentration, and an $NH_4$—N concentration when a feed rate of support is 30 m²/m³ in terms of a (total surface area of support)/(capacity of reaction tank).

(B) A test was performed by taking out the supports during use in Example 1 at a feed rate of support of 15 m$^2$/m$^3$ in terms of (total surface area of support)/(reaction tank capacity); pouring the supports to 300 mL of water to be treated so that the feed rate of support be 30 m$^2$/m$^3$ in terms of (total surface area of support)/(reaction tank capacity); and stirring the resulting mixture thoroughly (FIG. 6).

Figure 7:
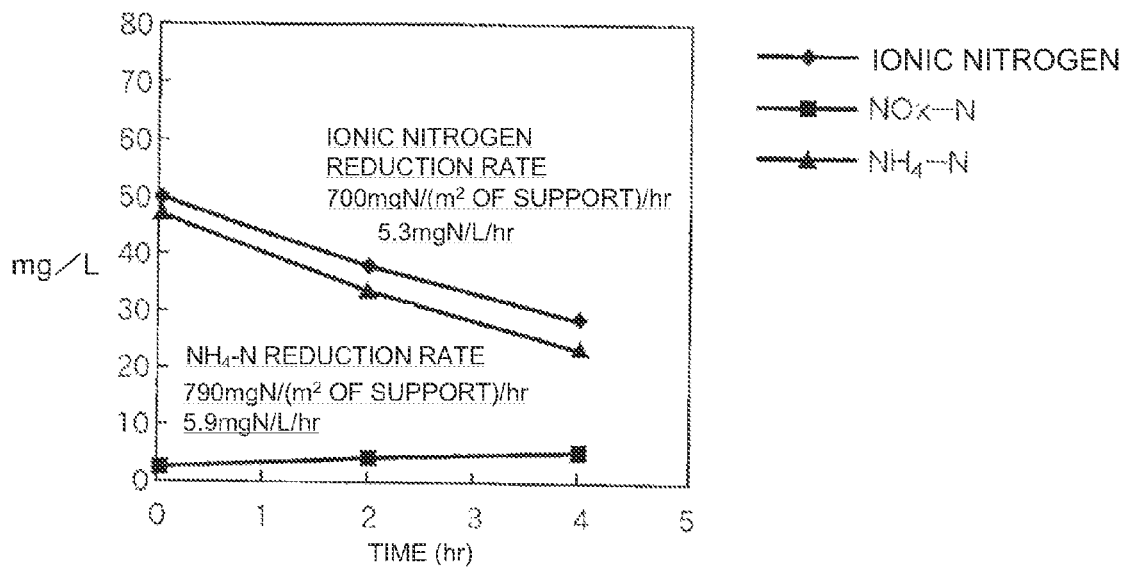
FIG. 7 is a graph showing a time change, in Example 2, of each of an ionic nitrogen concentration, an $NO_x$—N concentration, and an $NH_4$—N concentration when a feed rate of support is 7.5 m²/m³ in terms of a (total surface area of support)/(capacity of reaction tank).

(C) A test was performed by taking out the supports during use in Example 1 at a feed rate of support of 15 m$^2$/m$^3$ in terms of (total surface area of support)/(reaction tank capacity); pouring the supports to 300 mL of water to be treated so that the feed rate of support be 7.5 m$^2$/m$^3$ in terms of (total surface area of support)/(reaction tank capacity); and stirring the resulting mixture thoroughly (FIG. 7).

The test results under various test conditions are shown in FIGS. 5 to 7. In FIGS. 5 to 7, [NO$_x$—N] is defined as the sum of [NO$_3$—N] (nitrate nitrogen concentration) and [NO$_2$—N] (nitrite nitrogen concentration); ionic nitrogen is defined as the sum of [NH$_4$—N] (ammonia nitrogen concentration) and [NO$_x$—N]; an NH$_4$—N reduction rate (mgN/L/hr) is defined as (([NH$_4$—N] (at 0 hour)+[NH$_4$—N] (after 4 hours))/4; an NH$_4$—N reduction rate (mgN/(m$^2$ of surface area of support)/hr) is defined as (NH$_4$—N reduction rate)/(surface area of support); an ionic nitrogen reduction rate (mgN/L/hr) is defined as (ionic nitrogen (at 0 hour)+ionic nitrogen (after 4 hours))/4; and an ionic nitrogen reduction rate (mgN/(m$^2$ of surface area of support)/hr) is defined as (ionic nitrogen reduction rate)/(surface area). Comparison among FIGS. 5 to 7 has revealed that as the feed rate of support becomes lower, the ionic nitrogen reduction rate (mgN/L/hr) or (mgN/(m$^2$ of surface area of support)/hr) and the NH$_4$—N reduction rate (mgN/L/hr) or (mgN/(m$^2$ of surface area of support)/hr) increase and the NO$_x$—N increase rate (mgN/L/hr) or (mgN/(surface area of support: m$^2$)/hr) decreases. The NH$_4$—N reduction rate can be regarded as a nitrification rate, while the ionic nitrogen reduction rate can be regarded as an anaerobic ammonia oxidation rate.

The present inventor has obtained the following findings from the results of the above tests.

(1) There is a causal relationship between the feed rate of support and the nitrification rate defined as an ammonia nitrogen reduction rate. Higher the feed rate of support, lower the nitrification rate.

(2) There is a causal relationship between the feed rate of support and a nitrite type nitrification reaction. As the feed rate of support is lower, a nitrite type nitrification reaction is accelerated. When the feed rate of support is high, nitrate nitrogen is produced by a nitrate type nitrification reaction.

(3) There is a causal relationship between the feed rate of support and an anaerobic ammonia oxidation reaction. As the feed rate of support is lower, the anaerobic ammonia oxidation reaction is accelerated.

The present inventor has confirmed from the above findings that the feed rate of support has an influence on the acceleration of a nitrite type nitrification reaction, suppression of a nitrate type nitrification reaction, and acceleration of an anaerobic ammonia oxidation reaction.

INDUSTRIAL APPLICABILITY

According to the present invention, a nitrite type nitrification reaction is accelerated at such a level as to suppress a nitrate type nitrification reaction in order to simultaneously achieve acceleration of the nitrite type nitrification reaction and suppression of the nitrate type nitrification reaction by making use of the fact that production of nitrous acid contributes to inhibition of a nitrate type nitrification reaction. As a result, it becomes possible to carry out denitrification at a practical level by making use of an anaerobic ammonia oxidation reaction while relaxing the limitations on the ammonia nitrogen concentration of water to be treated, which is a target of the treatment, and water temperature, DO value, and pH value in a reaction tank. The present invention can therefore be applied to, as water to be treated which is a target of the treatment, wastewater of normal temperature containing ammonia nitrogen at a relatively low concentration such as municipal sewage or domestic wastewater and it is therefore industrially useful.

DESCRIPTION OF REFERENCE NUMERALS

10: Water treatment system
12: First settling tank
14: Reaction tank
16: Mixing tank
18: Second settling tank
20: DO meter
22: PO$_4$ meter
24: Coagulant injection pump
26: Support
27: Surface portion
28: Draft tube aerator
30: Partition 32: Blower
40: Impeller
42: Shaft
44: Drive unit
46: Air diffuser tube
48: Draft tube
50: $NH_4$—N meter
52: $NO_2$—N meter
54: $NO_3$—N meter
56: Air diffuser
57: ORP regulating tank
58: ORP meter
60: Reducing agent injection pump
62: Anaerobic tank
64: Aerobic tank
66: By-path
68: Return path

The invention claimed is:

1. A biological nitrogen removal method including an anaerobic ammonia oxidation reaction, the method comprising:

causing a support to flow, under aerobic conditions, in water to be treated containing a soluble nitrogen which has been poured in a reaction tank, the support having, on a surface portion thereof, a two-layered microbial film which holds, in an outer layer, a nitrite type nitrifying bacteria contributing to a nitrite type nitrification reaction or aerobic bacteria decomposing the soluble nitrogen other than ammonia into ammonia and a nitrite type nitrifying bacteria contributing to a nitrite type nitrification reaction as a dominant species and, in an inner layer, an anaerobic ammonia oxidizing bacteria contributing to an anaerobic ammonia oxidation reaction as a dominant species while being surrounded with the nitrite type nitrifying bacteria; and carrying out denitrification of the water to be treated using the anaerobic ammonia oxidation reaction;

wherein a feed rate of the support (total surface area of the support per unit capacity of the reaction tank) and/or a flow rate of the water to be treated at the surface of the support is/are adjusted so that an amount of nitrous acid produced by the nitrite type nitrification reaction through the action of the nitrite type nitrifying bacteria reaches a level to inhibit a nitrate type nitrification reaction;

wherein the denitrification of the water to be treated using the anaerobic ammonia oxidation reaction is performed without causing an active sludge to flow in the reaction tank;

wherein the feed rate of the support is decreased so that the amount of nitrous acid produced by the nitrite type nitrification reaction through the action of the nitrite type nitrifying bacteria reaches the level to inhibit the nitrate type nitrification reaction; and wherein the water to be treated containing the soluble nitrogen is wastewater having a normal temperature and having a soluble nitrogen concentration of 50 mg/L or less.

2. The biological nitrogen removal method including the anaerobic ammonia oxidation reaction according to claim 1, wherein the feed rate of support is adjusted so that an influent soluble nitrogen load falls within a range of from 4.0 to 11.5 $g/(m^2$ of support$)/day$.

3. The biological nitrogen removal method including the anaerobic ammonia oxidation reaction according to claim 1, wherein the feed rate of support is from 4 to 40 $m^2/m^3$.

4. The biological nitrogen removal method including the anaerobic ammonia oxidation reaction according to claim 1, wherein the denitrification of the water to be treated using the anaerobic ammonia oxidation reaction is performed with an ORP (oxidation reduction potential) of the water to be treated set to $-150$ mV or less.

5. The biological nitrogen removal method including the anaerobic ammonia oxidation reaction according to claim 1, wherein the denitrification of the water to be treated using the anaerobic ammonia oxidation reaction is performed while stirring the water to be treated so that the maximum flow rate of the water to be treated in the reaction tank be 0.7 m/sec or greater.

6. A biological nitrogen removal method including an anaerobic ammonia oxidation reaction, the method comprising:

causing a support to flow, under aerobic conditions, in water to be treated containing a soluble nitrogen which has been poured in a reaction tank, the support having, on a surface portion thereof, a two-layered microbial film which holds, in an outer layer, a nitrite type nitrifying bacteria contributing to a nitrite type nitrification reaction or aerobic bacteria decomposing the soluble nitrogen other than ammonia into ammonia and a nitrite type nitrifying bacteria contributing to a nitrite type nitrification reaction as a dominant species and, in an inner layer, an anaerobic ammonia oxidizing bacteria contributing to an anaerobic ammonia oxidation reaction as a dominant species while being surrounded with the nitrite type nitrifying bacteria; and carrying out denitrification of the water to be treated using the anaerobic ammonia oxidation reaction;

wherein a feed rate of the support (total surface area of the support per unit capacity of the reaction tank) and/or a flow rate of the water to be treated at the surface of the support is/are adjusted so that an amount of nitrous acid produced by the nitrite type nitrification reaction through the action of the nitrite type nitrifying bacteria reaches a level to inhibit a nitrate type nitrification reaction;

wherein the water to be treated containing the soluble nitrogen is wastewater having a normal temperature and having a soluble nitrogen concentration of 50 mg/L or less; and wherein the feed rate of the support is from 4 to 40 $m^2/m^3$.

* * * * *